March 18, 1958     H. R. FREUND ET AL     2,826,973
CENTERING AND QUADDING MECHANISM FOR PHOTOCOMPOSING MACHINES
Filed Nov. 23, 1956     9 Sheets-Sheet 1

INVENTORS
HERMAN R. FREUND
FRITZ STADELMANN
CARL G. YOUNGQUIST
BY
Curtis, Morris & Safford
ATTORNEYS

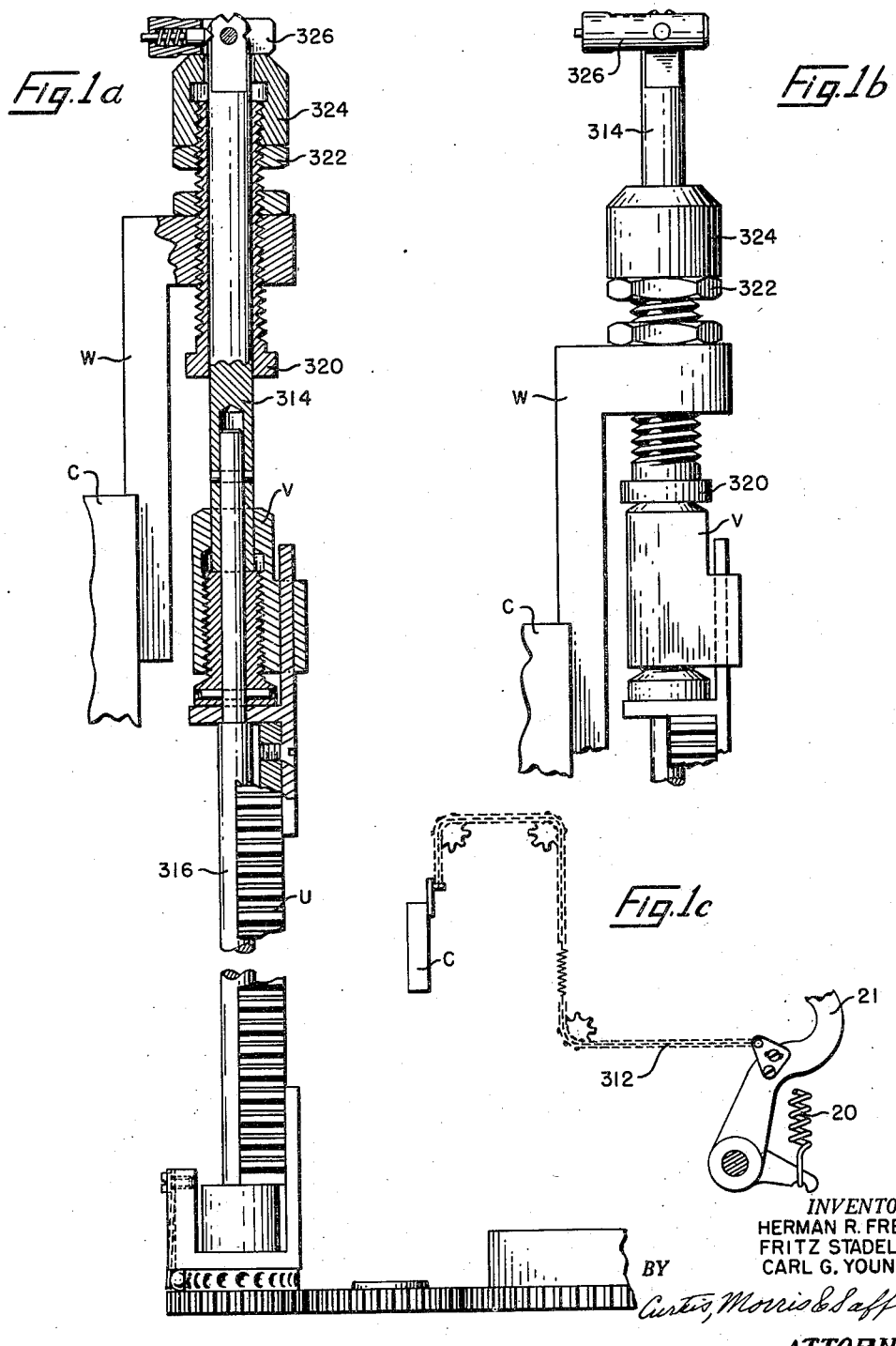

March 18, 1958 H. R. FREUND ET AL 2,826,973
CENTERING AND QUADDING MECHANISM FOR PHOTOCOMPOSING MACHINES
Filed Nov. 23, 1956 9 Sheets-Sheet 3

INVENTORS
HERMAN R. FREUND
FRITZ STADELMANN
CARL G. YOUNGQUIST
BY
Curtis, Morris & Safford
ATTORNEYS March 18, 1958  H. R. FREUND ET AL  2,826,973
CENTERING AND QUADDING MECHANISM FOR PHOTOCOMPOSING MACHINES
Filed Nov. 23, 1956  9 Sheets-Sheet 4

*INVENTORS*
HERMAN R. FREUND
FRITZ STADELMANN
CARL G. YOUNGQUIST
BY
*Curtis, Morris & Safford*
ATTORNEYS

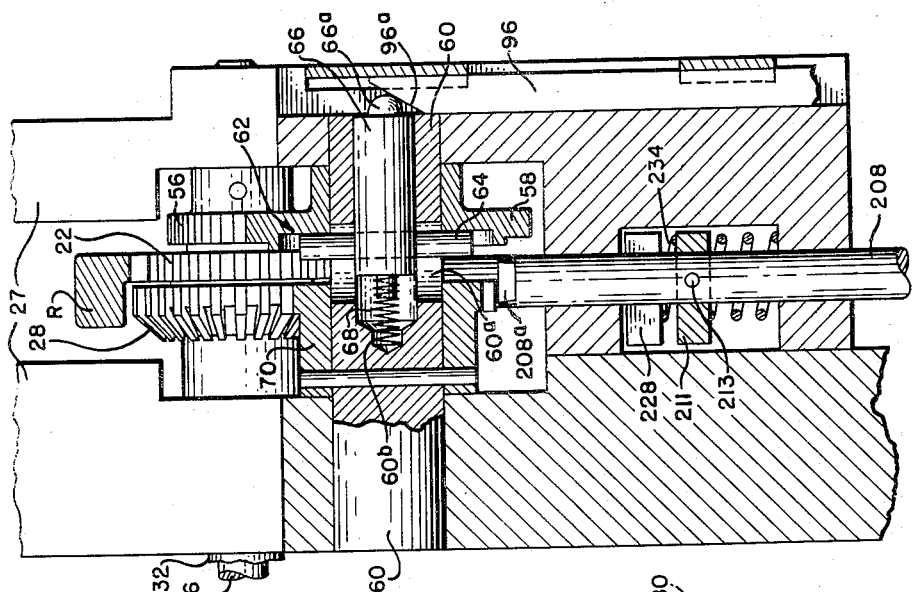
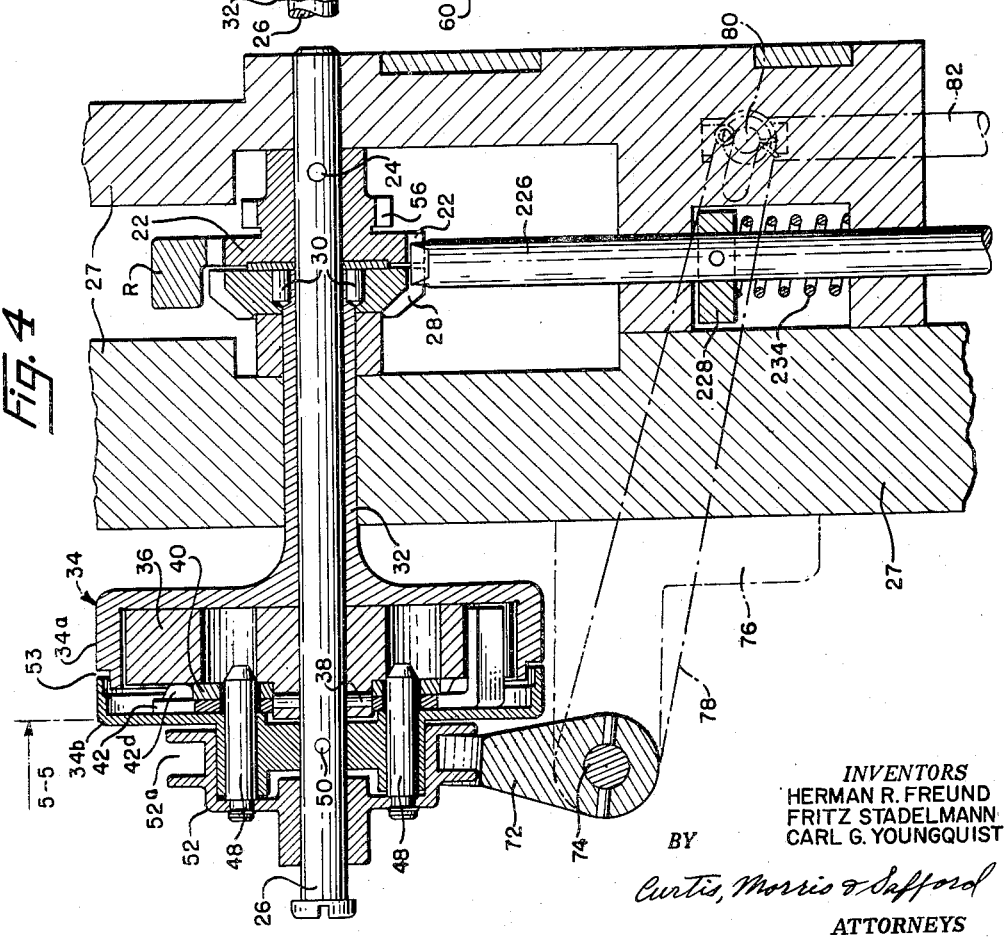
INVENTORS
HERMAN R. FREUND
FRITZ STADELMANN
CARL G. YOUNGQUIST
BY
Curtis, Morris & Safford
ATTORNEYS INVENTORS
HERMAN R. FREUND
FRITZ STADELMANN
CARL G. YOUNGQUIST
BY
Curtis, Morris & Safford
ATTORNEYS

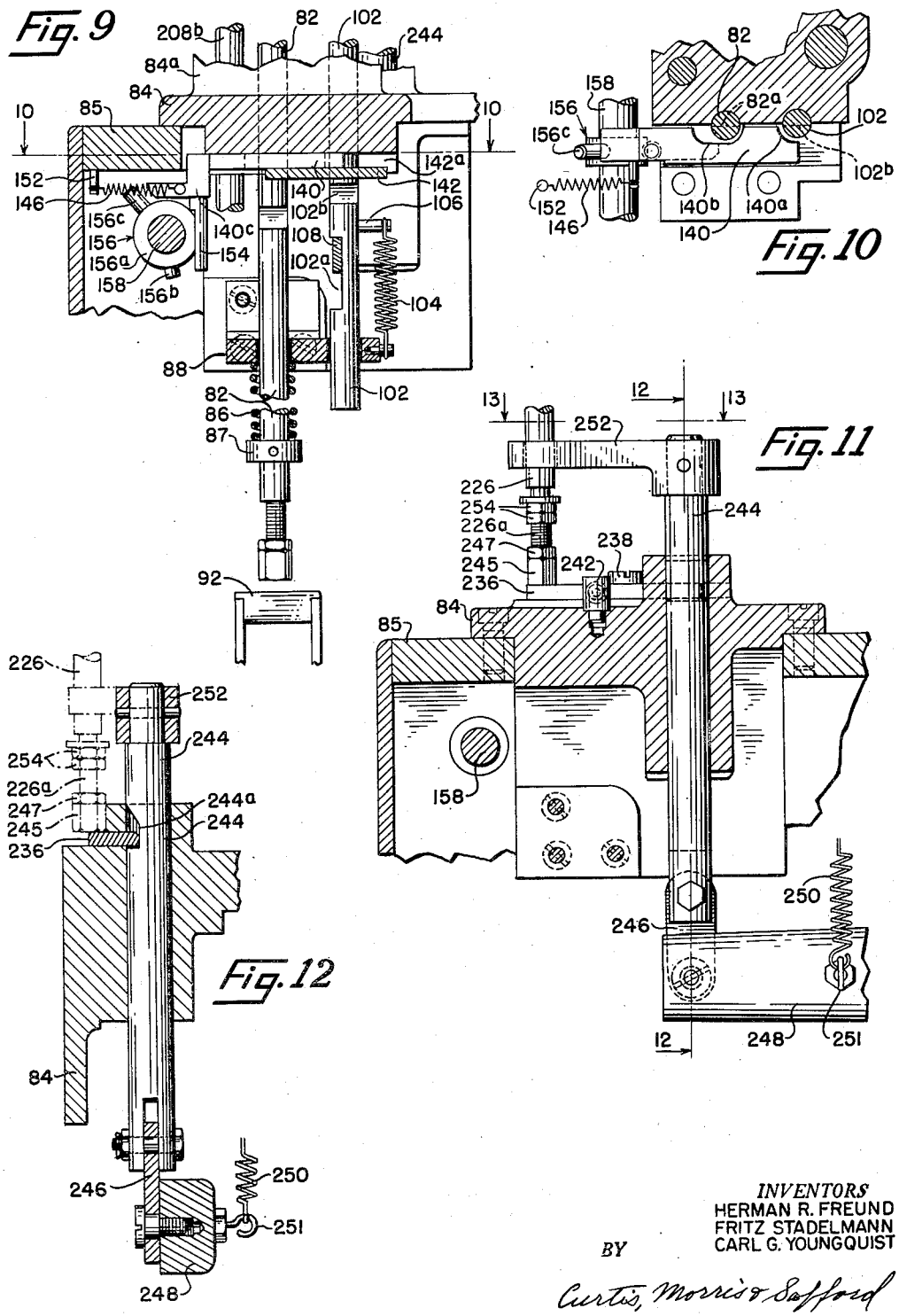

March 18, 1958 H. R. FREUND ET AL 2,826,973
CENTERING AND QUADDING MECHANISM FOR PHOTOCOMPOSING MACHINES
Filed Nov. 23, 1956  9 Sheets-Sheet 8

INVENTORS
HERMAN R. FREUND
FRITZ STADELMANN
BY CARL G. YOUNGQUIST
Curtis, Morris & Safford
ATTORNEYS

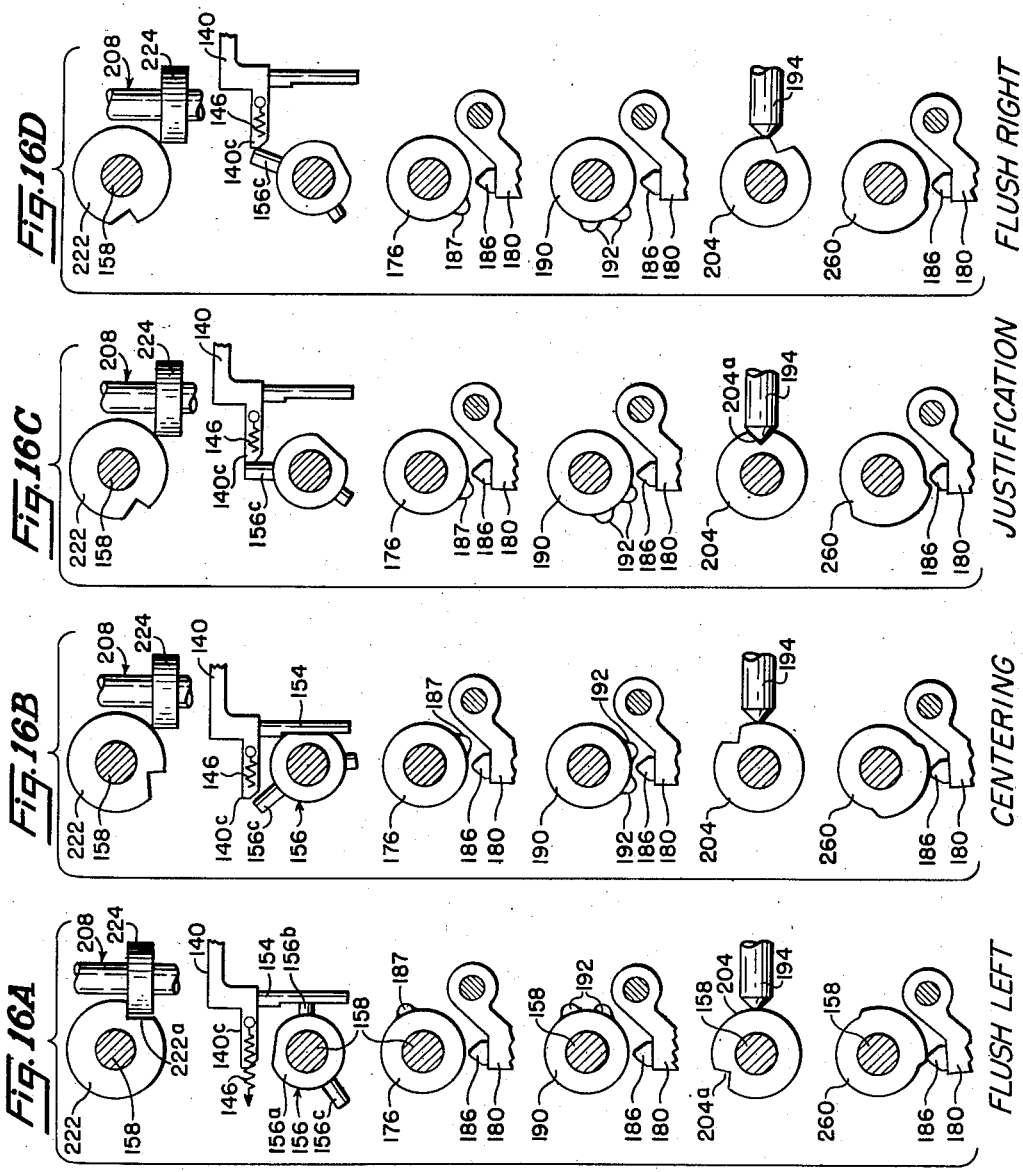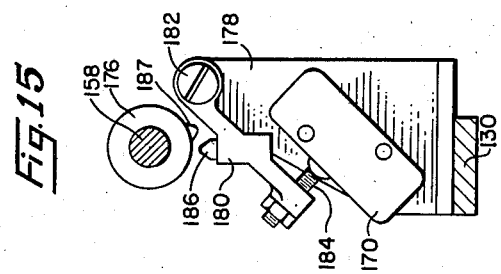

United States Patent Office 2,826,973
Patented Mar. 18, 1958

2,826,973

CENTERING AND QUADDING MECHANISM FOR PHOTOCOMPOSING MACHINES

Herman Richard Freund, deceased, late of Brooklyn, N. Y., by Herman Robert Freund, executor, Brooklyn, Fritz Stadelmann, Huntington, and Carl G. Youngquist, Freeport, N. Y., assignors, by mesne assignments, to Harris-Intertype Corporation, Cleveland, Ohio, a corporation of Delaware Application November 23, 1956, Serial No. 624,154

7 Claims. (Cl. 95—4.5)

This application is a continuation in part of our previous application, Serial No. 557,586 filed January 5, 1956, now abandoned, for a centering and quadding mechanism for photocomposing machines of the general class disclosed in U. S. Patent No. 2,552,882 issued May 15, 1951.

In such machines, the photographable type characters are borne on fronts of matrices having thicknesses or other body dimensions proportional to the setwise widths of the characters respectively borne thereby. The matrices are stored in a magazine from which they are selected by actuation of appropriate keys on a keyboard and assembled into a column from which they are individually and successively removed for photographing, then redistributed into their proper respective channels in the magazine. The film holder carrying the photographic film is indexed in a line-reading direction between successive exposures to space the character images along the film in composed lines.

U. S. Patent No. 2,645,168 issued July 14, 1953 discloses a tabular justifying mechanism for such machines which enables the composition of lines which are either justified, i. e. expanded to full column width, or are flush with either the left or right margin of the column, at the choice of the operator. This mechanism also makes it possible to justify any particular portion of a line so as to occupy a predetermined sub-columnar width, as in the composition of tabular matter.

However, prior to the present invention there has never before been available for machines of the above cited class a mechanism which was capable of automatically centering lines of less than full column width, a type of operation which is frequently desired for titles, headings, announcements and other display matter. Accordingly, in the composition of such lines it has been necessary for the operator first to "set" the line—i. e. select and assemble the matrices corresponding to the characters and inter-word spaces of the line, note the amount of "shortage"—i. e. the difference between the column width and the total setwise widths of the characters and inter-word spaces, divide this shortage by two, and insert the resulting width of "quads" or blank matrices at each end of the line. These several operations not only took time, but the inevitable human errors not infrequently produced improper centering.

The present invention provides for the first time a centering and quadding mechanism which is capable not only of justification, flush left and flush right operation, but also of fully automatic centering. The mechanism is reliable and accurate in operation, as well as being adapted for incorporation into existing photocomposing machines of the aforementioned class without extensive reconstruction and at reasonable cost.

The manner in which these desirable objectives are accomplished may be briefly summarized as follows: In photocomposing machines of the class involved, the assembled column of matrices is urged endwise against an endwall in the machine by a line follower member which is mechanically coupled to the film holder through a gear train of such ratio that, as each matrix is removed from the column, the film is advanced a distance sufficient to provide a fresh film field for the character borne by that matrix.

Initially, as soon as the column has been assembled and is "sent in" to the justifying and photographing mechanism, the column is pushed toward the endwall by the line follower member until the follower member strikes a stop member which is adjustably spaced from the endwall a distance corresponding to the desired line length. If the selector has been set to the "justify" position, a justifying rail pivoted at one end is then raised to drive up a wedge and force a spring-loaded plunger in the follower member outwardly to push the column of matrices against the endwall—a distance equal to the line "shortage." Then, as the matrices are individually removed from the column for photographing, with the follower member pushing the remaining matrices stepwise toward the endwall to fill up the spaces vacated by the matrices removed, the wedge member rides down the inclined rail, allowing the plunger to retract gradually. Thus, each stepwise movement of the follower member is slightly greater than the thickness of the matrix removed, and the film is advanced to space the character images proportionally more than the normal distance to fill the column from margin to margin.

In other types of operation, the justifying rail is locked down. If the selector is set for "flush left" operation, the gear train normally interconnecting the follower member and the film holder is rendered temporarily inoperative during the portion of the cycle when justification otherwise takes place. The stop member and the follower member are unlatched and allowed to move the column of matrices against the endwall, while the film holder is locked in its line-starting position. Thus, the first character image of the line is flush with the left margin. Prior to removal of the first matrix for photographing, the film holder is unlocked and the gear train is again rendered operative, so that, as each matrix is removed for photographing, the film is advanced the normal distance sufficient to provide a fresh film field for each character image. The last character image of the line thus falls short of the right margin a distance equal to the line shortage.

If "flush right" operation is selected, during the part of the cycle corresponding to that in which justification usually takes place, the stop member and the line follower member are unlatched and freed to press the column of matrices against the endwall, a distance of movement equal to the line shortage. During this time the follower is coupled to the film holder in the usual way so that movement of the line follower causes a corresponding movement of the film holder. Thus, the first character image of the line falls to the right of the left margin a distance equal to the line shortage and the last character image of the line is flush against the right margin.

If "centering" operation is selected, the primary gear train linking the follower member and the film holder is rendered inoperative and a secondary gear train is brought into play, coupling them together at a drive ratio exactly one-half that of the primary gear train. The stop member and the follower member are unlatched and allowed to move the column of matrices against the endwall. During this movement of the line follower through a distance equal to the line shortage, the film holder moves only one-half as far in proportion, so that one-half of the line shortage appears at the left-hand end of the line. Prior to removal of the first matrix, the secondary gear train is rendered inoperative and the primary gear train is again rendered operative so that the film will be advanced at the normal ratio during photographing of the characters. Thus, the line of character images occupies its usual setwise width and the remaining one-half of the line sortage appears at the right-hand end of the line so that the line is accurately centered.

In the drawings:

Figure 1a is an enlarged fragmentary view partly in section, showing in detail the mechanism for adjusting the film holder in accordance with different degrees of magnification whereby to establish a uniform line starting margin.

Figure 1b is a fragmentary elevational view of the upper portion of the mechanism shown in Figure 1a and shows the banking elements thereof in operative relationship.

Figure 1c is a schematic illustration of the resilient chain connection between the film holder and the line delivery lever.

Figure 4 is a vertical sectional view, at slightly enlarged scale, taken generally along the line 4—4 of Figure 1.

Figure 7 is a fragmentary sectional vertical view through the upper portion of the mechanism shown in Figures 2 and 3, taken generally along the line 7—7 of Figure 1.

Figure 9 is a vertical sectional view taken along the line 9—9 of Figure 8 and shows parts set for "centering."

Figure 10 is a horizontal sectional view taken generally along the line 10—10 of Figure 9.

Figure 11 is a vertical sectional view taken generally along the line 11—11 of Figure 8.

Figure 12 is a staggered vertical sectional view taken generally along the line 12—12 of Figure 11.

Figure 8:
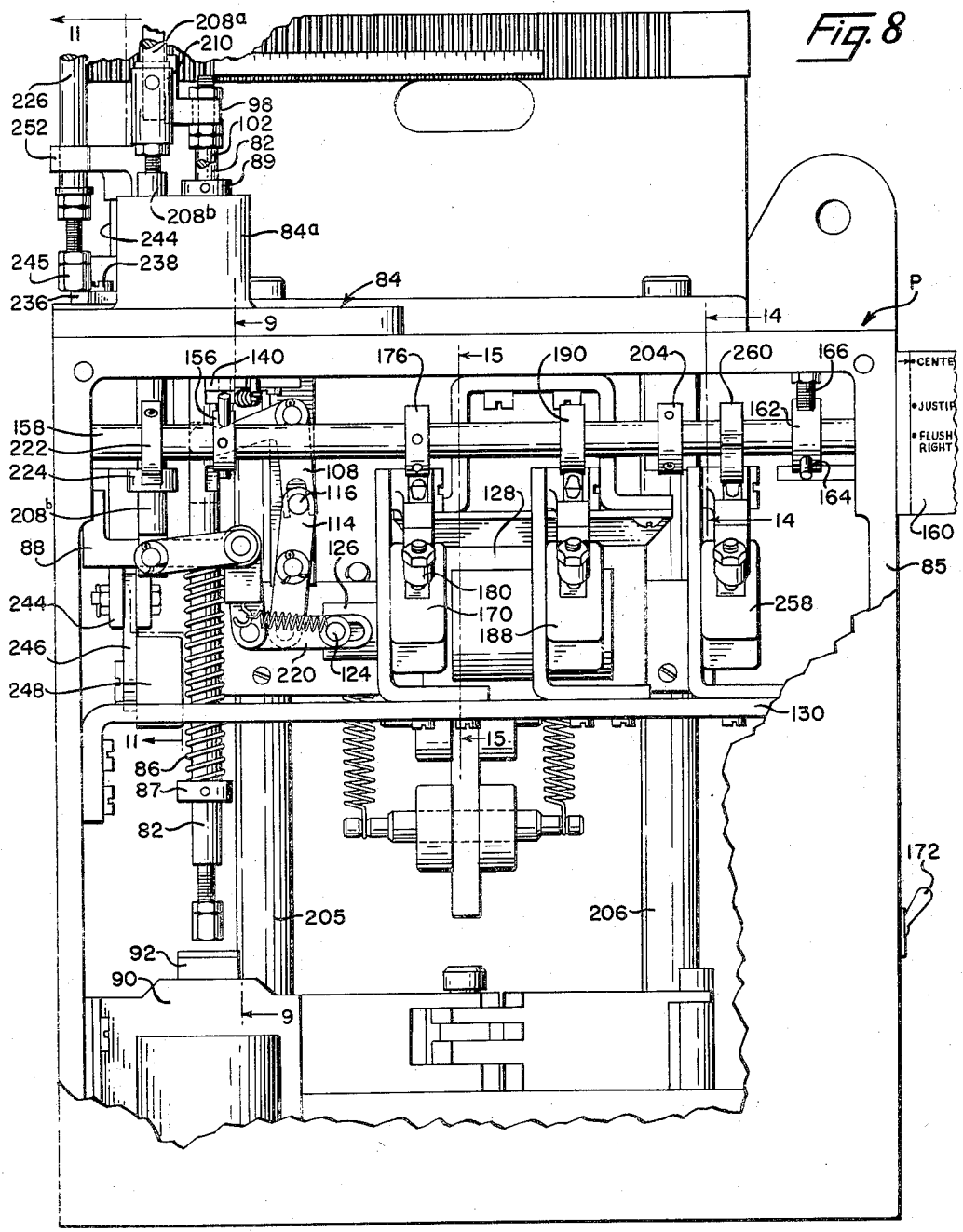
Figure 8 is a front elevational view of the lower portion of the centering and quadding mechanism shown in Figure 1 with the front cover of the housing shown partially broken away.
Figure 14:
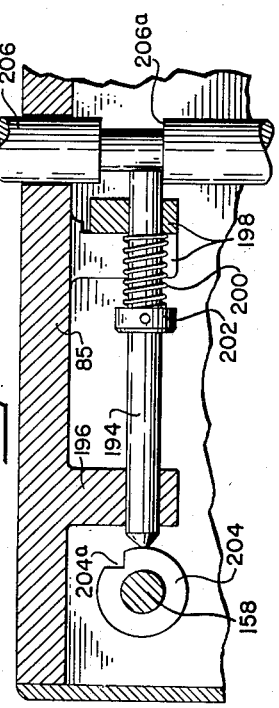

Figures 14 and 15 are vertical sectional views taken respectively along the lines 14—14 and 15—15 of Figure 8.

Figures 16A, 16B, 16C and 16D are diagrammatic views illustrating the positions of the several cams on the cam shaft of the centering and quadding mechanism in the four different settings of the selector knob, namely: Flush Left, Centering, Justification, and Flush Right, respectively.

Figure 17:
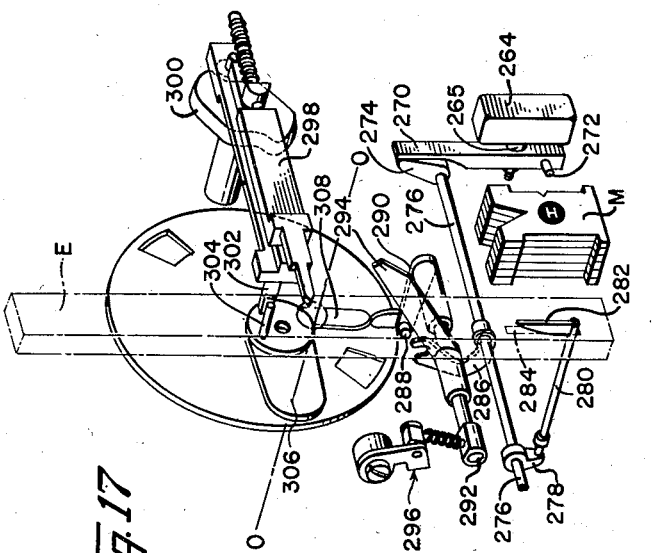

Figure 17 is a phantom isometric view of a portion of the camera mechanism of the composing machine illustrating the electrical switch which is actuated by the arrival of the column of matrices at the endwall of the camera unit.

Figure 18:
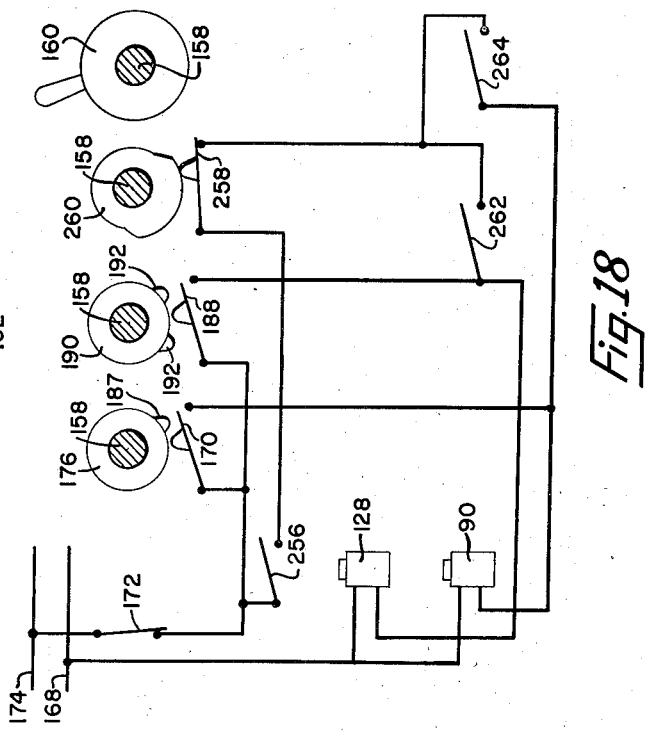

Figure 18 is a schematic diagram of the electrical circuit which controls the operation of the mechanism.

To facilitate understanding of the invention, the general sequence of operations of photocomposing machines of the class disclosed in the aforementioned Patent No. 2,552,882 will be briefly reviewed, it being understood that a more complete disclosure of the construction and operation of such machines may be obtained by reference to said patent.

Figure 1:
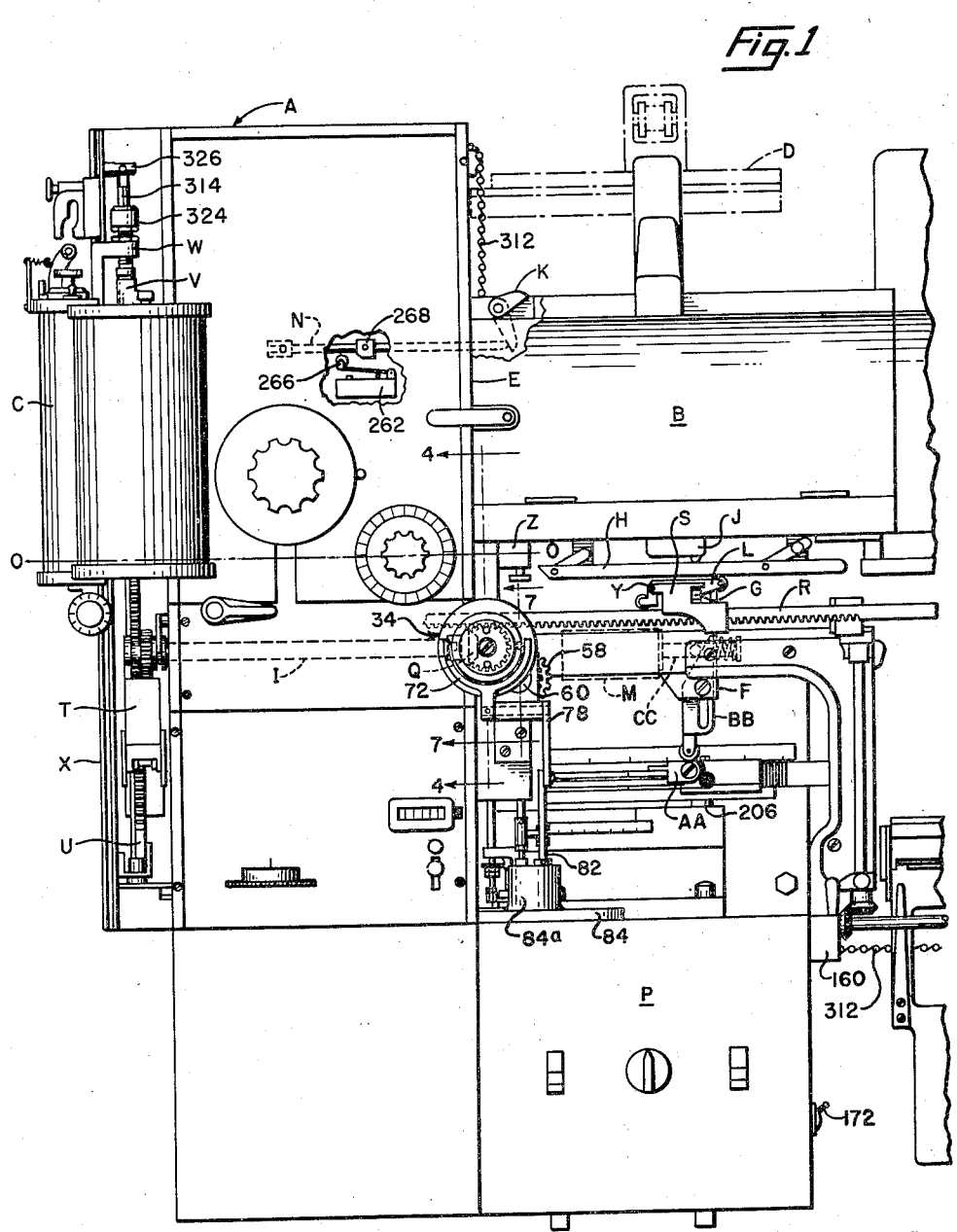
Figure 1 is a front elevational view of the upper left-hand portion of a photocomposing machine of the class disclosed in the aforementioned Patent No. 2,552,882, incorporating a centering and quadding mechanism embodying features of the present invention.

Figure 1 shows the upper left-hand corner of a photocomposing machine of the subject class, as viewed from the operator's position at the front of the machine. Visible in this figure is the camera unit A, the light cabinet B, the film holder C, and the control unit P within which much of the mechanism associated with the present invention is housed.

In Figure 1, the machine is shown at the point in its operating cycle at which the column of matrices M has been pushed leftward by the follower member F to the point where a finger G projecting forwardly from the line follower F has engaged a stop member S adjustably positioned on a rack R, and the line follower F and the stop S have been secured together by a latch L engaging the finger G. The stop member S is positioned along the rack R by means of a control knob (not shown) in such position as to stop the follower member F at a point where its left-hand face is spaced from the endwall E of the camera unit a distance corresponding to the desired line length.

As the finger G on the line follower F cams up the latch L on the stop member S to enter beneath, the latch L presses upwardly a movably-mounted rail H, actuating a push-button switch J to initiate the justifying and/or quadding and photographing operations of the machine.

As disclosed in the aforesaid Patent No. 2,552,882, closure of the switch J initiates rotation of a main cam shaft in the machine, causing the cam shaft to rotate through an angle of approximately 150°, at which point it comes to a stop automatically. During this 150° rotation of the main cam shaft, the justifying or quadding takes place, depending upon the type of operation which has been preselected.

During the first part of the 150° rotation of the main cam shaft, the rack R, the stop S, and the line follower F are locked in position by means of a locking rod engaging the teeth of the rack R, as will be described more fully hereinafter. Also during the first part of the 150° rotation, the locking rod is retracted, freeing the rack R, the stop S, and the line follower F for movement to press the column of matrices M against the end wall E of the camera unit A. Shortly after the lock is retracted, the distributing elevator D reaches its lower position against the top of the light cabinet B. As this occurs, the distributing elevator engages a bell crank K which is pivoted at the top of the light cabinet, causing the bell crank to rotate and press a rod N to the left as viewed in Figure 1, engaging a clutch (not shown) to initiate operation of the camera unit.

During the photographing operation, the matrices are individually and successively removed from the left-hand end of the column and transported stepwise upwardly along the endwall E first to a photographing position and thence to the upper part of the camera unit A where they are pushed onto the distributing elevator D.

The rack R is coupled to the film holder C through a gear train including a miter gear Q, a shaft I, an interchangeable gear box T, and a rack U carrying at its upper end an adjustable head V the top of which operatively supports a bracket W secured to the upper end of the film holder C. The film holder C is slidably supported on the camera unit by means of slide rails X and is urged downwardly by gravity. The weight of the film holder, exerted through the gear train just described, augmented by a spring 20 (Figure 1c) on the delivery lever 21 the upper end of which is connected by a link (not shown) to rack R, urges the rack R, the stop S, and the line follower F to move leftward. Thus, as matrices are individually and successively removed from the column for photographing, the line follower F will press the remaining matrices leftward to fill up the space vacated. Thus, the line follower F and its associated elements will move stepwise through incremental distances equal to the thickness of the matrices removed from the column. This movement, through the gear train previously described, will permit the film holder C to move downward stepwise through distances sufficient to present a fresh film field for each succeeding character image.

A plurality of lenses are provided in the camera unit A for optically enlarging or reducing the sizes of the photographic images of the characters borne by the matrices M so that composed type of a range of point sizes may be achieved with a single font of matrices. The interchangeable gear box T allows the incremental advances of the film holder C to be controlled in accordance with the degree of enlargement or reduction of the photographic images.

As the last matrix is removed from the line, the forward end of the latch member L, which is pivoted at Y on the stop S, engages the endwall E of the camera unit, rocking the latch L so that its right-hand end actuates a switch Z. This switch Z causes the main cam shaft to rotate further through an angle of approximately 210°, thus completing one revolution and coming to rest at its original starting position. During this latter movement of the main cam shaft, the distributing elevator D is raised to lift the matrices to the top of the machine where they are delivered into a conventional distributing mechanism for distribution into their proper respective channels in the magazine.

We now come to the mechanism which enables the machine to accomplish either justification, flush left, flush right, or centering operation as desired.

Figure 2:
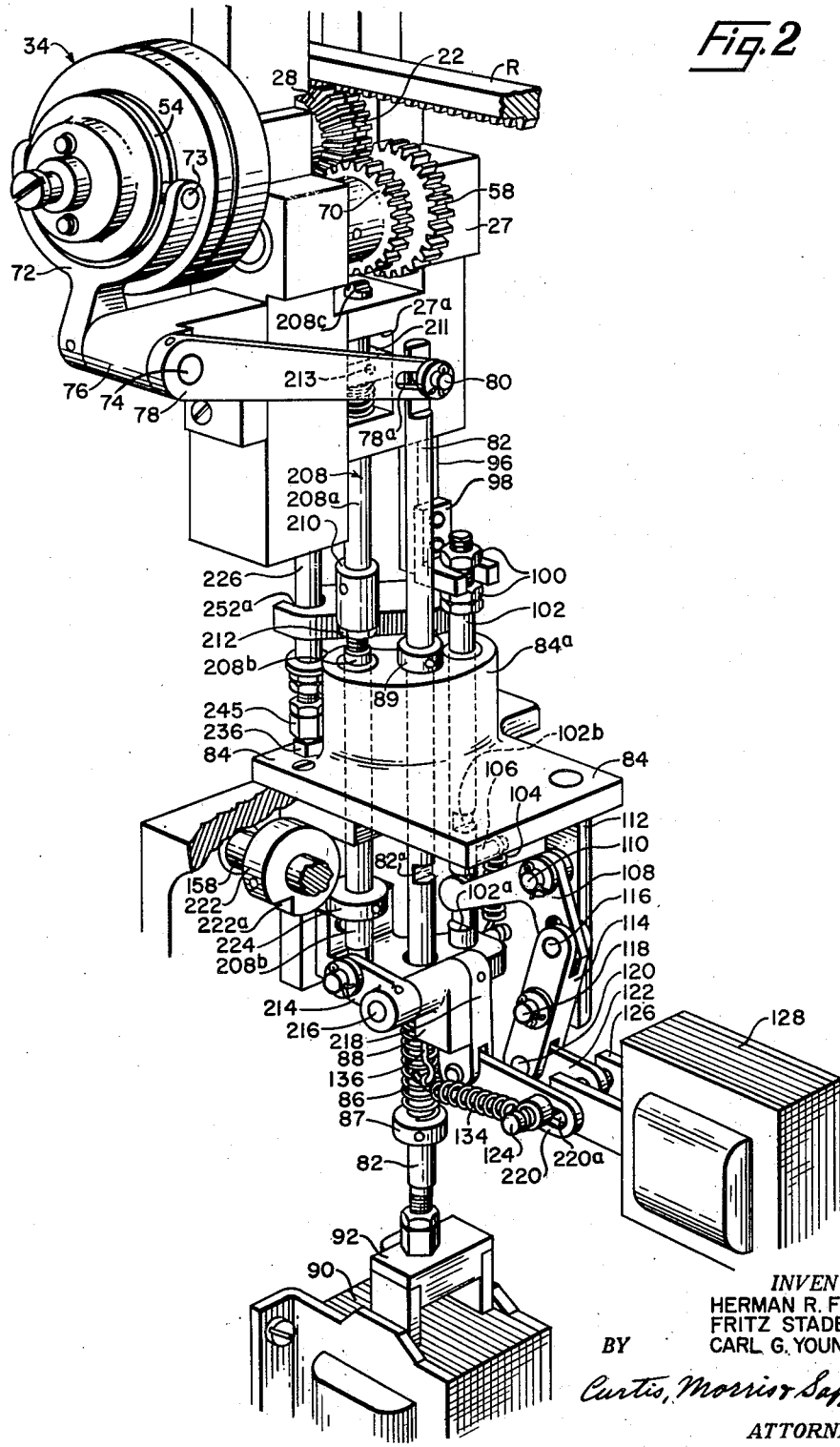
Figure 2 is an enlarged, fragmentary, upper front quarter isometric view of a portion of the centering and quadding mechanism, with certain parts broken away to reveal its inner construction.
Figure 3:
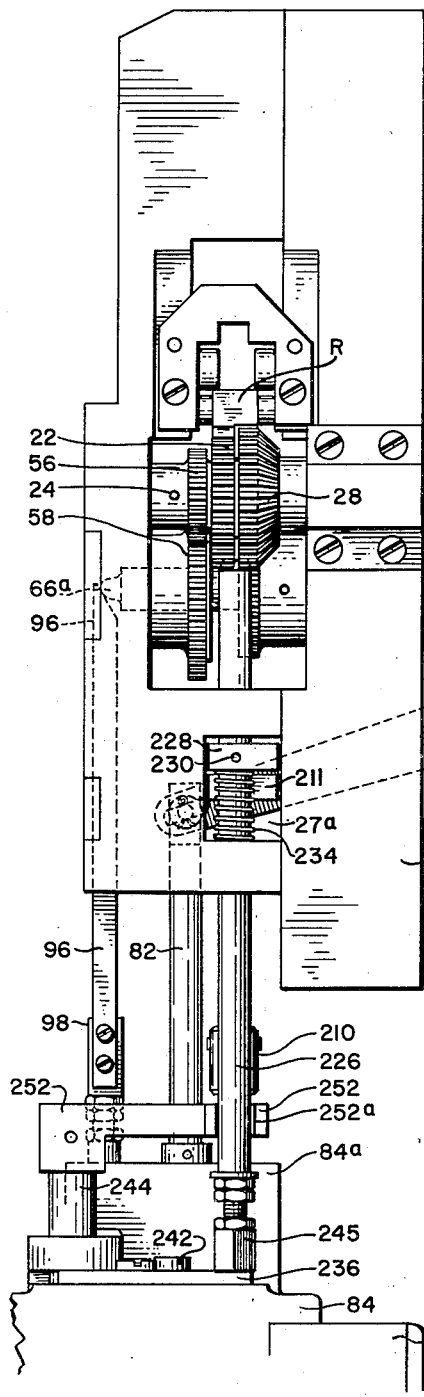
Figure 3 is an end elevational view of the mechanism shown in Figure 2.

As may be seen in Figures 2 and 3, the rack R, to which the stop S and line follower F are attached, meshes with a spur gear 22. As may be seen in Figure 4, this gear 22 is secured by means of a pin 24 near one end of a shaft 26 which is journalled in a block 27 secured to the frame of the machine. Mounted coaxially and in face-to-face contact with the gear 22 is a compound miter-and-spur gear 28. The mitered portion of this gear 28 meshes with the miter gear Q (Figure 1) which is operatively connected, as previously described, with the film holder C. The two "split" gears 22 and 28 take the place of a single gear of the same overall size and shape in the photocomposing machine disclosed in the aforementioned Patent No. 2,552,882. As will readily be understood by those familiar with this class of machine, this feature permits the present invention to be incorporated in such machines without extensive modification of the machine.

As may be seen in Figure 4, the compound gear 28 is keyed by pins 30 to a sleeve 32 which encloses and rotatably supports the forward end of the shaft 26 and which is in turn rotatably journalled in the block 27. The sleeve 32 has integrally formed at its forward end the casing 34a of a roller clutch generally indicated 34.

Figure 6:
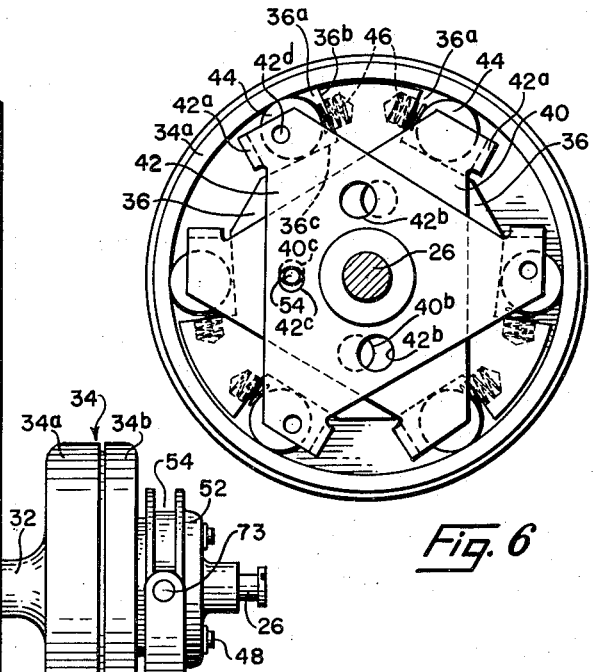
Figure 6 is a view similar to Figure 5, but showing the clutch engaged.
Figure 5:
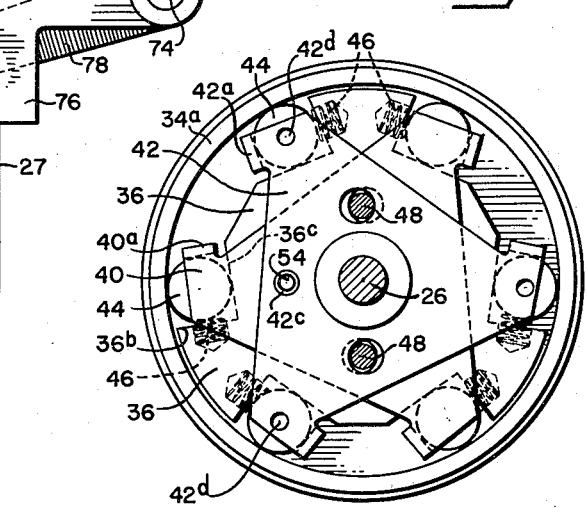
Figure 5 is a vertical sectional view of the clutch shown in Figure 4, taken generally along the line 5—5 of Figure 4, with the clutch shown disengaged.

As may be seen with reference to Figures 4, 5, and 6, the roller clutch 34 includes an inner body member 36 which is rotatably received within the casing 34a and which is fixed on the inner shaft 26 by a pin 38. Lying against the forward face of the body member 36 are two generally triangular spiders 40 and 42, superimposed one in front of the other, in rotatable face-to-face contact with each other and with the front face of the body member 36. The body member 36 is provided with six recesses 36a, each containing a cylindrical roller 44. Each of these recesses is defined by a radial shoulder 36b, and a base 36c extending perpendicularly thereto, with alternate shoulders around the periphery of the body member 36 facing in opposite directions. The bases 36c are inclined relative to the inner wall of the casing 34a of the clutch so that the recesses are somewhat narrower at their open ends at their closed ends, and the rollers 44 are urged toward the open ends of the recesses by means of small helical compression springs 46.

The rollers 44 are thus normally wedged between the bases 36c and the inner wall of the clutch casing 34a to bind the rollers against rotation and to lock the inner body member 36 and the casing 34a of the clutch against relative rotation.

Each of the two spiders 40 and 42 is provided at its three apices with inwardly projecting tabs 40a or 42a which are adapted to engage the rollers 44 and press them inwardly toward the shoulders 36b of the body member against the resistance of the springs 46. Such movement of the spiders 40 and 42 and their fingers 40a and 42a is produced by a pair of tapered pins 48 (Figure 4) loosely secured to a collar 52 which is slidably supported on the exposed forward end of the inner shaft 26. The pins 48 slidably project through openings in the front cover member 34b of the clutch 34, the front cover member 34b being fixed on the inner shaft by means of a pin 50 and the rim thereof overlapping the casing 34a of the clutch at a rotating joint 53.

When the collar 52 is moved rearwardly on the shaft 26, the tapered rear ends of the pins 48 project into holes 40b and 42b in the spiders 40 and 42 respectively, and wedge the spiders in opposite directions from the position shown in Figure 6 to that shown in Figure 5. This movement of the spiders causes their tabs 40a and 42a to press the rollers 44 inwardly toward the shoulders 36b of the body member 36 against the resistance of the springs 46. This removes the rollers 44 from wedged-in relation between the bases of the recesses 36a and the inner walls of the clutch casing 34a, freeing the rollers for rotation and allowing the body member 36 to rotate relative to the clutch casing 34a.

In order to prevent excessive movement of the spiders 40 and 42 relative to each other, and to insure that the tapered pins 48 will enter into the holes 40b and 42b in the spiders, the spiders are provided with additional holes 40c and 42c (Figures 5 and 6) through which is loosely received a pin 54 projecting from the body member 36. The spiders 40 and 42 engage the adjacent ends of the rollers 44 to prevent endwise movement of the rollers, the outer spider 42 being provided with bosses 42d for this purpose.

It will be understood that when the roller clutch 34 is disengaged, the two gears 22 and 28 (Figure 4) are capable of rotation independently of each other. When the clutch 34 is engaged, the sleeve 32 is fixed against rotation relative to the inner shaft 26, and the two gears 22 and 28 move as one. Thus, when longitudinal movement of the rack R causes rotation of the gear 22, the gear 28 will rotate with it and, through the miter gear Q (Figure 1) and the gear train previously described, the film holder C will be moved downwardly at such ratio as to provide a fresh film field for each successive character image. This gear train will be referred to hereinafter as the "primary" gear train and the ratio of movement of the film holder relative to the movement of the line follower which it effects will be referred to as 1:1 ratio, although it will be understood that the ratio may actually be somewhat greater or less than 1:1 where the gear gox T in use is changed to compensate for photographic enlargement or reduction of the type characters.

As may be seen in Figure 4, formed integrally with the aforementioned gear 22 is a smaller spur gear 56 which, as may be seen in Figure 3, meshes with a larger spur gear 58. As shown in Figure 7, the latter gear 58 is rotatably supported on a large shaft 60 which is rotatably journalled in the block 27. The forward face of the gear 58 is recessed and provided with radial slots to serve as the plate of a key clutch generally designated 62. This clutch 62 includes a key 64 which projects radially through slots 60a in the shaft 60 from either side of an inner rod 66 which is slidably received in an axial bore within the shaft 60. The rod 66 is urged to the right, as viewed in Figure 7, by means of a coil spring 68 which is compressed between the left-hand end of the rod and the endwall of a recess 60b in the shaft 60. This causes the key 64 to be normally engaged in the radial slots in the face of the gear 58 to engage the clutch 62 and prevent rotation of the gear 58 relative to the shaft 60. The key clutch 62 may be disengaged by leftward movement of the rod 66 against the resistance of the spring 68, the elongated slots 60a permitting this longitudinal movement of the rod 66 relative to the shaft 60 while keying the two against relative rotational movement. Fixed on the shaft 60 is another spur gear 70 which meshes with the spur-toothed portion of the aforementioned compound spur-and-miter gear 28.

It will thus be seen that when the key clutch 62 is engaged, the rack R is coupled to the film holder C through gears 22, 56, and 58, key clutch 62, shaft 60, gears 70 and 28, miter gear Q (Figure 1), and thence through the gear train previously described. The gear 56 has only one-half as many teeth as the meshing gear 58, while the ratio between the meshing gears 70 and 28 is 1:1. Thus, when the key clutch 62 is engaged, the rack R and the film holder C are coupled together at a 1:2 ratio. This latter gear train is referred to hereinafter as the "secondary" or 1:2 gear train.

As best shown in Figure 2, the roller clutch 34 is actuated by means of a yoke 72 the arms of which carry inwardly projecting pins 73 which are loosely received in an annular groove 52a in the collar 52. The yoke 72 is fixed at its lower end on one end of a rock shaft 74 which is rotatably supported in a bracket 76 secured to the front face of the block 27. Fixed at the opposite end of the rock shaft 74 is a crank arm 78 which is provided at its rearward end with a slot 78a in which is slidably received a pin 80 projecting laterally from the upper end of a rod 82. The rod extends slidably through a boss 84a in the casting 84 which forms part of the top cover for the housing 85 of the control unit P.

The rod 82 is urged downwardly by means of a coil spring 86 which encircles the rod 82 and is compressed between a collar 87 fixed on the rod 82 and the lower face of a bracket 88 (see also Figure 9) which is suitably supported on the housing of the control unit. The downward movement of the rod 82 under the influence of the spring 86 is limited by means of a collar 89 (Figure 2) which is fixed on the rod 82 and engages the upper face of the boss 84a.

The spring 86 normally holds the rod 82 in its lower position, in which it is shown in Figures 2 and 4, at which position the roller clutch 34 is disengaged. The rod 82 may be driven upwardly against the resistance of the spring 86 by means of a solenoid 90, the plunger 92 of which is positioned adjacent the lower end of the rod 82. When the rod 82 is pushed upwardly by energization of the solenoid, it rotates the crank arm 78, the rock shaft 74 and the yoke 72 in a counterclockwise direction, as viewed in Figure 2. This moves the collar 52 to the left, withdrawing the pins 48 (Figure 4) from the holes 40b and 42b in the spiders 40 and 42, removing the tabs 40a and 42a of the spiders from engagement with the rollers 44, as shown in Figure 6, allowing the rollers to wedge between the body member 36 and the casing 34a of the clutch, engaging the clutch.

The key clutch 62 is actuated by means of a rod 96, the upper end 96a of which is bevelled and adapted to cooperate with a rounded projection 66a at the rearward end of the rod 66. When the rod 96 is raised, its bevelled upper end 96a presses the rod 66 to the left against the resistance of the spring 68, moving the key 64 out of engagement with the front face of the gear 58, disengaging the clutch 62.

The rod 96 is provided at its lower end with a notched member 98 which is engaged by lock nuts 100 adjustably threaded on the upper end of a rod 102 which extends slidably through the boss 84a in the casting 84 and an extension of bracket 88 (Figure 9). The rods 102 and 96 are urged downwardly by means of a tension spring 104 which extends between a pin 106 projecting from the lower end of the rod 102 and a suitable anchor point on the bracket 88.

The downward movement of the shafts 96 and 102 under the influence of the spring 104 is limited by means of a bell crank 108, one arm of which is received in a slot 102a formed at the lower end of the rod 102. The bell crank 108 is pivotally mounted on a pin 110 projecting laterally from an arm 112 which extends downwardly from the casting 84. The lower end of the other arm of the bell crank 108 is slotted and thereby pivotally attached to the upper end of a fork-ended lever 114 by means of a pin 116.

The lever 114 is fulcrumed on a pin 118 which projects from the lower end of the arm 112. The lower end of the lever 114 is pivotally attached by means of a pin 120 to one end of a link 122 whose other end is pivotally attached to a crossbar 124 carried by the plunger 126 of a solenoid generally indicated 128.

As shown in Figure 8, the solenoid 128 is secured on a horizontal shelf 130 which extends between the side walls of the housing 85 of the control unit P.

The plunger 126 of the solenoid 128 is urged toward the left, as viewed in Figure 2, by means of a spring 134 which is tensioned between the projecting forward end of the crossbar 124 and a pin 136 which extends downwardly from the aforementioned bracket 88.

Energization of the solenoid 128 draws its plunger 126 to the right against the resistance of the spring 134, pulling the link 122 in the same direction, rotating the lever 114 in a counterclockwise direction and the bell crank 108 in a clockwise direction to raise the rods 102 and 96 against the resistance of the spring 104 and cause the bevelled upper end 96a of the rod 96 (Figure 7) to push the rod 66 to the left and disengage the key clutch 62.

The clutch actuating rods 82, 102 and 96 may be locked in their upper positions by means of a locking slide 140 (Figure 10) which is slidably supported in a channel 142a formed in a block 142 which is secured to the lower face of the casting 84. The locking slide 140 is adapted to engage notches 82a and 102b in the rods 82 and 102 respectively, the locking slide being provided with cutouts 140a and 140b which allow clearance for the rods 82 and 102 in certain longitudinal positions of the locking slide 140 to free the rods for vertical movement.

The locking slide 140 is urged forwardly (to the left as viewed in Figures 9 and 10) by means of a coil spring 146 which is tensioned between a pin 148 projecting from an offset portion 140c at the forward end of the locking plate 140, and a pin 152 which projects downwardly from the upper wall of the housing 85 of the control unit. Forward movement of the locking plate 140 under the influence of the spring 146 is limited by engagement of a cam 156 with the offset portion 140c of the locking slide and/or with a finger 154 projecting downwardly therefrom.

The cam 156 has radially projecting from its hub 156a a relatively short pin 156b and a longer pin 156c which are respectively adapted for engagement with the finger 154 and the offset portion 140c of the locking slide 140 in certain positions of the cam 156.

As may be seen in Figure 8, the cam 156 is one of a number of cams fixed on a cam shaft 158 which is journalled in the side walls of the housing 85 and which is fixed at its right-hand end, as viewed in Figure 8, a selector knob 160. The cam shaft 158 is provided with a detent (not shown) to insure its proper angular positioning in the various settings of the selector knob 160. It is also provided with a stop collar 162 (Figure 8) having stop pins 164 adapted to engage adjustable studs 166 projecting from the housing 85 of the control unit to limit the rotation of the cam shaft and selector knob to the angular range in which the four desired settings of the knob occur.

Figures 16A to 16D, inclusive, show the positions of each of the cams on the cam shaft 158 in the four positions of the selector knob 160. As indicated in Figures 16A to 16D, these figures respectively represent the settings for "flush left," "centering," "justification," and "flush right" operation. Each of these four figures includes six diagrammatic views, one view of each of the cams on the cam shaft 158, with the cam which appears farthest to the left in Figure 8 shown at the top in Figures 16A and 16D and with the other cams following below it in the same order in which they appear from left to right in Figure 8. The cam 156, which is second from the left in the view of Figure 8, thus appears second from the top in each of the Figures 16A to 16D.

As may be seen in Figure 16B, when the selector knob 160 is set for "centering" operation, finger 154 of the locking slide 140 is drawn to the left, under the influence of spring 146, against a flattened portion of the hub 156a of the cam 156. This is the position in which it is out of engagement with the rods 82 and 102.

As may be seen in Figure 16A, when the selector knob is moved from "centering" to "flush left" the cam shaft 158 rotates in a counterclockwise direction through an angle of approximately 90° thus causing one of the projections 192 on cam 190 to effect energization of solenoid 128 thereby causing rod 102 to be raised to effect disconnection of key clutch 62. Also, during this rotation the short pin 156b on the cam 156 engages the downwardly projecting finger 154 on the locking slide 140 which is thereby pressed to the right a short distance against the tension of spring 146 to a position where it engages notch 102b in the rod which is thus locked in its upper position to which it was driven by the solenoid 128. In this operating position, rod 82 is not locked in its upper position.

Figure 16C shows the position of cam 156 when the selector knob 160 is set for "justification," which involves a clockwise rotation of cam shaft 158 of approximately 45° from "centering" position. During this rotation projection 187 on cam 176 and one of the projections 192 on cam 190 cause energization of solenoids 90 and 128, respectively, thereby driving rods 82 and 102 upwardly. Also, during this rotation, the long pin 156c is brought into engagement with the offset portion 140c of locking slide 140 thereby pressing the locking slide to the right against the resistance of spring 146 to an extent sufficient to bring the locking slide into engagement with both of the rods 82 and 102 which are thereby locked in their upper positions.

As may be seen in Figure 16D, movement of the selector knob 160 to the "flush right" position rotates the cam shaft 158 further in a clockwise direction through an angle of about 15°, pressing the locking slide 140 slightly farther to the right as viewed in Figures 16D and 10 against the resistance of the spring 146. This leaves the locking slide in engagement with both of the two rods 82 and 102, locking them both in their upper positions.

The purpose of thus locking the rods 82 and 102 in their upper positions against the force of the springs 86 and 104 respectively (Figure 2) is to eliminate the need for maintaining the energization of the solenoids 90 and 128 which drive these rods upwardly. The solenoids need be energized only momentarily, for example in shifting from one position of the selector knob 160 to another. This minimizes current drain and eliminates the problem of overheating.

The electrical circuit by which the solenoids are energized is shown in Figure 18. As may be seen in this figure, the upper terminal of each of the two solenoids 90 and 128 is connected to a conductor 168 which is connected to one terminal of a source of electrical power.

The lower terminal of the solenoid 90 is connected through a normally open, single-pole, single-throw, push-button switch 170 and through a normally open, single-pole, single-throw toggle switch 172 to a conductor 174 which is connected to the remaining terminal of the power source.

The toggle switch 172 is mounted on the housing of the control unit P, as may be seen in the lower right-hand corner of Figure 1. This switch serves as a master control switch for the centering and quadding mechanism.

The push-button switch 170 is mounted adjacent the cam shaft 158 for actuation by a cam 176 thereon, as shown in Figures 8 and 15. As may be seen in the latter figure, the switch 170 is mounted on a bracket 178 which is secured to the shelf 130. Mounted on the same bracket 178 is a switch actuating lever 180 which is fulcrumed at its upper end on a screw 182 and is provided at its lower end with an adjustable stud 184 adapted to cooperate with the push-button actuating member of the switch 170. The lever 180 is also provided with a projection 186 which is adapted to cooperate with a projection 187 on the cam 176 and cause the lever 180 to be rotated in a counterclockwise direction about the screw 182 and the switch 170 to be actuated whenever the cam shaft 158 is rotated to bring the projection 187 on the cam 176 into engagement with the projection 186 on the lever 180.

As may be seen in Figures 16A to 16D inclusive (the third view from the top in each of these figures) the cam 176 is so oriented on the cam shaft 158 that the lever 180 is depressed and the switch 170 (Figures 15 and 18) is actuated when the selector knob is moved from the "centering" position to the "justification" position or vice versa. As previously described, when the control knob 160 is in the "justification" and "flush right" positions, the rod 82 is locked in its upper position by the locking slide 140 (Figure 10). Thus, whenever the selector knob is moved from the "centering" position to the "justification" position, the solenoid 90 is momentarily energized to drive the rod 82 to its upper position and the locking slide 140 is moved to lock the rod 82 in this position. This holds the roller clutch 34 engaged, rendering the primary or 1:1 gear train operative. This condition will continue until the selector knob is again moved from the "justification" position back to the "centering" position. When this occurs, the solenoid 90 is momentarily energized, but since the rod 82 is already in its upper position, it is not affected. However, as previously described, when the selector knob 160 is in the "centering" and "flush left" positions, the locking slide 140 (Figure 10) is out of engagement with the rod 82, allowing the spring 86 to move the rod downwardly to its lower position at which the roller clutch 34 is disengaged to disconnect the rack R from the film holder C through the primary gear train.

As may be seen in Figure 18, the lower terminal of the solenoid 128 is connected through a normally open, single-pole, single-throw push-button switch 188 and through the aforementioned master switch 172 to the conductor 174. The switch 188 is mounted similarly to the switch 170 for actuation by means of a cam 190 on the cam shaft 158. As may be seen in Figures 16A to 16D (the fourth views from the top in each of these figures), the cam 190 is provided with two projections 192 which are adapted to cooperate with the projection 186 on the switch actuating lever 180 which is provided for actuation of the switch 188. The cam 190 is so oriented that the switch 188 is momentarily actuated whenever the selector knob 160 is moved in either direction to or from the "centering" position.

As previously described, the locking slide 140 (Figure 10) is out of engagement with the rod 102 when the selector knob 160 is in the "centering" position, thereby allowing the rods 102 and 96 to be pulled downwardly by the spring 104 (Figure 2), engaging the key clutch 62 and connecting the rack R to the film holder C through the secondary or 1:2 gear train. When the control knob is moved in either direction from the "centering" position, the solenoid 128 is momentarily energized, raising the rods 102 and 96 and disengaging the key clutch 62. Since the rod 102 is locked in its upper position by the locking slide 140 in all settings of the selector knob 160 other than the "centering" position, the key clutch will remain disengaged and the secondary gear train will remain inoperative until the selector knob 160 is returned to the "centering" position.

From the foregoing description, it will be seen that during the initial movement of the line follower F and rack R (Figure 1) to press the column of matrices M against the endwall E of the camera unit, if the selector knob 160 has been set for "centering" both the rods 82 and 102 will be in their lower positions, disengaging the roller clutch 34 and engaging the key clutch 62 so that the rack R will be connected to the film holder only through the secondary or 1:2 gear train. Thus, as the line follower F and rack R move through a distance corresponding to the line shortage, the film holder will move through a distance proportionately one-half as great, to cause one-half of the line shortage to appear at the left-hand end of the line, thereby centering the line.

When the selector knob is set in the "flush left" position, the rod 82 is in its lower position, so that the roller clutch 34 is disengaged, and the rods 102 and 96 are in their upper position so that the key clutch 62 is also disengaged. Thus, both the primary and secondary gear trains are inoperative, and the initial movement of the line follower F and rack R does not produce any movement of the film holder. The first character image of the line thus falls flush with the left margin.

In both "justification" and "flush right" positions of the selector knob 160, both the rod 82 and the rods 102 and 96 are in their upper positions at which the roller clutch 34 is engaged and the key clutch 62 is disengaged. Thus, the rack R is connected to the film holder C only through the primary or 1:1 gear train. In "flush right" operation, the initial movement of the line follower through a distance corresponding to the line shortage therefore causes a proportionate movement of the film holder C so that the first character image of the line is spaced from the left margin a distance equal to the line shortage and the last character image of the line falls flush with the right margin.

In "justification" operation, the line follower F does not move to press the line of matrices against the endwall E of the camera unit (Figure 1), but instead, the justification rail AA (Figure 1) is moved upwardly to drive a wedge BB and cause it to force leftward a plunger CC mounted on the line follower F a distance sufficient to move the column of matrices M against the endwall E of the camera unit. Since there is no movement of the line follower F and rack R, there is no movement of the film holder C, and the first character image falls flush with the left margin.

In all types of operation other than "justification," the justifying rail AA is locked down so that the plunger CC remains flush against the line follower F, as shown in Figure 1. This is accomplished by a locking rod 194 (Figure 14) which is slidably supported in brackets 196 and 198 depending from the upper part of the housing 85 of the control unit P. This locking rod 194 is urged forwardly (to the left as viewed in Figure 14) by a coil spring 200 which encircles the rod 194 and is compressed between the bracket 198 and a collar 202 fixed on the rod. Movement of the rod under the influence of the spring 200 is limited by engagement of the forward end of the rod with a cam 204 which is fixed on the cam shaft 158. This cam 204 is so constructed that in all but one rotational position of the cam, the rod 194 is pressed rearwardly (to the right as viewed in Figure 14) against the resistance of the spring 200 to keep the rearward end of the rod engaged in an annular recess 206a in the post 206 which with post 205 serves to raise the right-hand end of the justification rail AA (Figure 1). However, the cam 204 is provided with one notch 204a of sufficient depth to permit the spring 200 to move the rod 194 sufficiently forward (leftward as viewed in Figure 14) to remove its end from engagement in the annular recess 206a in the post 206. As shown in Figures 16A to 16D, inclusive (the next to bottom view in each of these figures), the cam 204 is so oriented that the notch 204a is aligned with the rod 194 when the selector knob 160 is set to the "justification" position. Thus, the justification rail AA is raised by the posts 205 and 206 in the "justification" position only; at all other positions the justification rail remains down.

In the "flush left" setting of the selector knob 160, not only are both the primary and secondary gear trains rendered inoperative, but non-movement of the film holder is further insured by locking the spur gear 70 which meshes with the compound gear 28, which in turn is coupled to the film holder C. This is accomplished by means of a locking rod 208 (Figures 2 and 7) which is formed at its upper end to provide a single tooth 208a which engages the teeth of the gear 70.

As may be seen in Figure 2, this locking rod 208 extends through and is slidably supported by the boss 84a on the casting 84. To permit variation in the overall length of the rod 208, it is divided into upper and lower parts 208a and 208b, respectively, adjustably joined together by a sleeve 210 which is fixed on the lower end of the upper portion 208a and which is threaded on the upper end of the lower portion 208b and fixed in position by a lock nut 212. The locking rod is held against rotational movement and limited in its range of vertical movement by a block 211 (Figure 2) which is fixed near the upper end of the rod by a pin 213 and is slidably received in a rectangular opening 27a in the block 27.

The rod 208 is pivotally secured at its lower end to one end of a crank arm 214 fixed on a rock shaft 216 which is rotatably journalled in the aforementioned bracket 88. Fixed at the opposite end of the rock shaft 216 is another crank arm 218 which is pivotally attached at its other end to a link 220 which is provided at its opposite end with an elongated slot 220a through which projects the crossbar 124 of the solenoid 128. As previously mentioned, the plunger 126 and crossbar 124 of the solenoid 128 are urged toward the left, as viewed in Figure 2, by the spring 134, and this force, transmitted through the linkage just described, urges the locking rod 208 upwardly to the position at which its tooth 208c is in engagement with the teeth of the gear 70.

When the solenoid 128 is energized, the crossbar 124 is moved to the right, as viewed in Figure 2, against the resistance of the spring 134, pulling the link 220 and rotating the crank arm 218, rock shaft 216, and crank arm 214 in a counterclockwise direction, pulling the locking rod 208 downwardly to remove its tooth 208c from engagement with the gear 70, as shown in Figures 2 and 7.

The locking rod 208 may also be pulled down by means of a cam 222 on the cam shaft 158, this cam cooperating with a collar 224 secured near the lower end of the rod 208. The arrangement of the cam 222 and collar 224 are such that in all but one position of the cam shaft 158, the rod 208 is held down by the cam 222, against the force of the spring 134. However, the cam 222 is provided with a single notch 222a, and, as shown in Figures 16A to 16D inclusive (the upper views in each of these figures), the cam 222 is so oriented that this notch is opposite the collar 224 on the rod 208 when the selector knob 160 is in the "flush left" position. At this position, the notch 222a allows the collar 224 and the locking rod 208 to be moved upwardly by the spring 134, bringing the tooth 208c at the upper end of the locking rod into engagement with the teeth of the gear 70. This movement of the linkage, including the crossbar 124 of the plunger 126 of the solenoid 128, also pulls the link 122 to the left, as viewed in Figure 2, rotating the lever 114 in a clockwise direction and the bell crank 108 in a counterclockwise direction. However, this does not produce any movement of the rod 102 because the elongated slot 102a in the rod 102 allows the end of the crank arm to move freely downward.

If the solenoid 128 is energized during the time the rod 208 is held down by the cam 222, pulling the plunger 126 and the crossbar 124 to the right, as viewed in Figure 2, this does not produce any movement of the link 220 or of the rod 208, because, as may be seen in Figure 2, the elongated slot 220a in the link 220 permits free movement of the crossbar 124 to the right.

During the first part of the initial 150° movement of the main cam shaft, the line follower F, stop S and rack R are locked against movement. Thus, in "justification" operation, these elements are fixed when the justification rail AA (Figure 1) is driven upwardly to drive up the wedge BB and force the plunger CC leftward to press the column of matrices M against the endwall E of the camera unit.

This locking function is performed by a locking rod 226 (Figure 3) which is supported in the block 27 and which is provided at its upper end with a single tooth adapted to enage not only the teeth of the spur gear 22 which meshes with the rack R but also those of the compound spur-and-miter gear 28 which is connected to the film holder C (Figure 1). The locking rod 226 is held against rotational movement and limited in its range of vertical movement by a rectangular block 228 which is fixed on the rod 226 by a pin 230, this block 228 being slidably received in the rectangular opening 27a in the block 27. The locking rod 226 is urged upwardly to the position in which it is shown in Figure 3, at which position the tooth at its upper end is in engagement with the teeth of the gears 22 and 28, by means of a coil spring 234 which encircles the rod and is compressed between the block 228 and the bottom wall of the opening 27a. In order to make sure that the rod 226 cannot be driven downwardly against the force of the spring 234 by camming action of the teeth of the gears 22 and 28 against the tooth at the upper end of the rod, when the rod is in its upper position, its lower end rests upon a blocking member 236 which is supported on the upper face of the casting 84.

Figure 13:
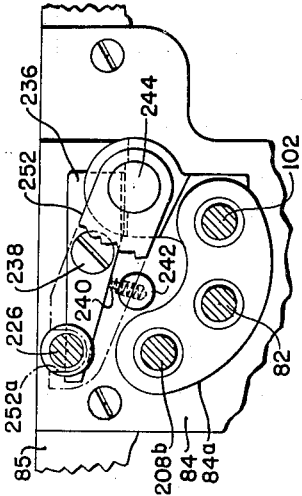
Figure 13 is a horizontal sectional view taken generally along the line 13—13 of Figure 11.

As shown in Figures 11, 12 and 13, and particularly in Figure 13, the blocking member 236 is mounted to pivot in a horizontal plane about a screw 238, and is urged in a clockwise direction as viewed in Figure 13 by means of a coil spring 240 which is compressed between a stud 242 projecting upwardly from the casting 84 and the adjacent edge of the blocking member 236. Further clockwise movement of the blocking member 236 under the influence of the spring 240 is limited by engagement of the opposite end of the blocking member 236 with the inner wall of a recess 244a in an actuating rod 244 which is slidably supported in the casting 84 (see particularly Figure 12).

The blocking member 236 is thus normally maintained in the position in which it is shown in Figures 11, 12 and 13, at which its forward end (its left-hand end as viewed in Figure 13) is partially interposed beneath the lower end of the rod 226 to maintain the rod 226 in its upper position in locking engagement with the gears 22 and 28 (Figure 3). The overall length of the rod 226 is made adjustable by a cap member 245 (Figures 11 and 12) which is adjustably threaded on the lower end 226a of the rod and is fixed in position by a lock nut 247.

As disclosed more fully in the aforesaid Patent No. 2,552,882, the actuating rod 244 is pivotally connected through a link 246 with one end of a lever 248 which is urged in a clockwise direction, as viewed in Figure 11, by means of a coil spring 250 tensioned between an eye 251 projecting from one side of the lever 248 and the underside of the housing 85 of the control unit. This lever 248 is actuated by a cam on the main cam shaft of the machine.

The actuating rod 244 carries at its upper end a laterally extending arm 252 which is provided with a notch 252a (Figures 13 and 2) in which the rod 226 is loosely received. This arm 252 is adapted to engage a pair of locking nuts 254 which are adjustably secured on a threaded portion 226a near the lower end of the rod 226. After approximately 55° of the first 150° rotation of the main cam shaft, the lever 248 is rotated in a counterclockwise direction, as viewed in Figure 11, against the resistance of the spring 250, pulling down the rod 244 and causing a beveled cam surface in the recess 244a Figure 12 to engage the adjacent edge of the blocking member 236 and cam the blocking member in a counterclockwise direction, as viewed in Figure 13, against the resistance of the spring 240. This removes the blocking member 236 from beneath the lower end of the rod 226 and, as the rod 244 continues its downward movement, the arm 252 engages the nuts 254 on the rod 226, drawing the rod 226 down against the resistance of the spring 234 (Figure 3) and removing the tooth at the upper end of the rod from engagement with the gears 22 and 28. This frees the rack R, stop S, and line follower F (Figure 1) for movement.

If the selector knob 160 has been set for "justification," during the first part of the 150° rotation of the main cam shaft, the plunger CC (Figure 1) will already have been driven leftward to push the column of matrices M against the endwall E of the camera unit, so that no movement of the line follower F, stop S, and rack R will take place when the locking rod 226 (Figure 3) is removed from engagement with the gears 22 and 28. In all other types of operation, when the locking rod 226 is removed from engagement with the gears 22 and 28, the aforementioned spring means (augmented in "centering" and "flush right" operation by the weight of the film holder C) moves the rack R, stop S,, and line follower F leftward to press the column of matrices M against the endwall E of the camera unit, a distance of movement equal to the line shortage.

Depending upon the setting of the selector knob 160, this movement of the line follower and its associated elements either produces no movement of the film holder (in "flush left" operation), movement of the film holder at a 1:1 ratio (in "flush right" operation), or movement of the film holder at a 1:2 ratio (in "centering" operation).

In any even, following the initial movement of the line follower and its associated elements, and prior to the photographing operation, it is necessary that these elements be connected to the film holder C through the primary or 1:1 gear train, so that as the matrices are individually and successively removed from the column for photographing, the film will be advanced prior to the photographing of each character by a distance sufficient to provide a fresh film field for the image of that character. Since the primary gear train is already connected during "justifying" and "flush right" operation, it is only "flush left" and "centering" operation that the mechanism need be reset prior to photographing of the matrices. This is accomplished by electrical switches shown in Figures 17 and 18.

As may be seen in Figure 18, the conductor 174 which is connected to one terminal of the power source is connected through the master switch 172 and through a normally closed, single-pole, single-throw interlock switch 256 with one contact of a normally open single-pole, single-throw push button switch 258.

The normally closed interlock switch 256 (Figure 18) is mounted so that it is opened when the rack R is returned to its starting position. In the event of a jamming of matrices in the camera unit, the rack R must be returned to its starting position before the jam can be cleared. This opens the switch 256 and, in the case of "flush left" or "centering" operation, de-energizes the solenoids 90 and 128. This not only prevents overheating of the solenoids during clearing of the jam but also obviates the possibility that in clearing the jam some elements of the gear train may be thrown out of timing with respect to others.

The switch 258 (Figure 18) is adapted for actuation by a cam 260 on the cam shaft 158 (see also Figure 8). As may be seen in Figures 16A to 16D, inclusive (the bottom view in each of these figures), the cam 260 is so shaped and oriented that the switch 258 is closed when the selector knob 160 is set in the "flush left" and "centering" positions and is open in the other positions of the selector knob.

The other contact of this switch 258 is connected to one contact of each of two switches 262 and 264, the other contacts of which are respectively connected to the lower terminals of the solenoids 128 and 90. The two switches 262 and 264 are normally open, single-pole, single-throw, push-button switches.

As may be seen in the upper left-hand portion of Figure 1, the switch 262 is mounted in the camera unit A and is provided with an actuating leaf 266 positioned for cooperation with a dog 268 adjustably secured on the aforementioned clutch actuating rod N. As previously mentioned, the rod N is pressed leftward by a bell crank K when the distributing elevator D descends into position for receiving the matrices which are discharged from the camera unit A after photographing. As also previously mentioned, the distributing elevator D seats in matrix receiving position during the latter part of the 150° rotation of the main cam shaft, after the matrices M have been pressed leftward against the endwall E of the camera unit but prior to photographing of any of the matrices. In "centering" operation, with the switch 258 (Figure 18) closed, closure of the switch 262 energizes the solenoid 128 (Figure 2), pulling its plunger 126 and the link 122 to the right, rotating the lever 114 in a counterclockwise direction and the bell crank 108 in a clockwise direction and pushing up the rods 102 and 96 to disengage the key clutch 62 (Figure 7). This renders the secondary or 1:2 gear train inoperative.

The solenoid 128 will remain energized until the first part of the 210° rotation of the cam shaft when, after the matrices have been photographed and transferred into the distributing elevator D (Figure 1), the distributing elevator is raised, opening the switch 262 and breaking the circuit to the solenoid 128.

As may be seen in Figure 17, the aforementioned switch 264 is mounted in the camera unit A and is adapted to be actuated by a lever 270 which is pivoted near its lower end at 272 and which engages the actuating plunger 265 of the switch 264. The upper end of the lever 270 is engaged by an arm 274 projecting radially upward from a rock shaft 276 which is rotatably supported in the camera unit. The rock shaft 276 also carries a short, downwardly projecting crank arm 278 which is engaged by one end of a rod 280 carrying at its opposite end a sensing member 282. This sensing member 282 projects from a slot 284 in the endwall E of the camera unit in position to be engaged and depressed into the slot 284 by the column of matrices M as they arrive at the endwall E.

When the sensing member 282 is thus depressed, it pushes the rod 280 to the left, as viewed in Figure 17, rotating the rock shaft 276 in a clockwise direction, depressing the upper end of the lever 270 and rotating the lever in a clockwise direction about its pivot 272, and depressing the actuating plunger 265 of the switch 264 to close the switch.

Also, when the sensing member 282 is depressed, arm 286 attached to rock shaft 276 will be rocked in a clockwise direction until its forked upper end is in vertical alignment with a pin 288 projecting from an arm 290 fixed on shaft 292 which is rotatably supported by the frame of the camera unit. Also fixed on the shaft 292 is a sensing arm 294 which projects through a slot in endwall E of the camera in a position to be engaged and rocked in a counterclockwise direction by a matrix moving upwardly along endwall E into photographing position on the optical axis O—O of the machine. As more fully disclosed in the aforementioned Patent No. 2,552,882, depression of sensing arm 294 and consequent rocking of shaft 292 on which it is mounted will cause the over-the-center toggle mechanism, generally indicated 296, to break in the opposite direction thus rocking arm 290 in a counterclockwise direction to open the camera safety shutter 306. When arm 290 is rocked in a counterclockwise direction pin 288 is driven downwardly into the fork of arm 286 thus locking switch 264 in closed position thereby holding solenoid 90 energized.

As more fully disclosed in the aforementioned Patent No. 2,552,882 a matrix aligning bar 298 is reciprocated by a cam 300 to cause its pointed end to enter into a V-shaped notch in the side of each matrix and thereby accurately position the matrix relative to the optical axis O—O. After the last matrix of the line has passed the photographing position the over-travel of the bar 298, due to the absence of a matrix in position for engagement, causes an arm 302 on the bar to engage a pin 304 which is eccentrically located on the pivotally mounted safety shutter 306 and thereby rotates the shutter in a counterclockwise direction to a position intersecting the optical axis O—O, as shown in Figure 17, thereby preventing further exposure of the photographic film. The shutter is connected through a link 308 with the end of the aforementioned arm 290 on the shaft 292, so that the rotation of the shutter causes a counterclockwise rotation of the shaft 292, throwing the toggle mechanism 296 to its opposite position, and removing the pin 288 from the latch arm 286. This allows the shaft 276 and lever 270 to rotate in a counterclockwise direction, permitting the switch 264 to open.

It will thus be seen that the switch 264 is closed by movement of the first matrix into contact with endwall E and opened after the last matrix has passed the photographing position. In "flush left" and "centering" operation, with the switch 258 (Figure 18) closed, closure of the switch 264 energizes the solenoid 90 and drives its plunger 92 (Figure 2) upwardly, pushing up the rod 82 and engaging the roller clutch 34 to render the primary or 1:1 gear train operative.

It will therefore be understood that in all types of operation the primary gear train is operative and the secondary gear train is inoperative during photographing. The film holder C is thus coupled to the rack R at a 1:1 ratio so that a fresh film field is presented for each successive character image.

When the last matrix has been removed for photographing, the line follower F engages the endwall E of the camera unit, rocking latch L upwardly and closing the switch Z (Figure 1), starting the main cam shaft in rotation through the remaining 210°. During this latter rotation of the main cam shaft, the rack R and film holder C are returned to starting position after which the distributing elevator D is raised to transfer the matrices to a distributing mechanism by which they are returned to their respective channels in the magazine.

In "centering" operation, during the 150° rotation of the main cam shaft, at which time the line shortage is measured, rack R and meshing gear 22 moved independently of the compound miter-and-spur gear 28 thus causing misalignment of the pitches thereof. This misalignment remains constant during photographing after which solenoid 90 is de-energized, clutch 34 is disengaged, film holder C and rack R are returned to rest position at which the pitch of gears 22 and 28 are again in alignment, solenoid 128 is de-energized and clutch 62 is reengaged. Shortly after gears 22 and 28 come to rest, locking rod 226 is raised into engagement with teeth thereof and thus locks them against rotation.

Immediately the 210° rotation starts, the line follower F is driven back to line receiving position and en route engages the rack R which is thus returned to starting position in the manner disclosed in U. S. Patent No. 2,552,882. Rack R, in returning to starting position, causes rotation of gears 22, 56 and 58 and when it reaches its starting position the keyway in gear 58 is disposed to receive key 64 when it is released by de-energization of solenoid 128 after all gears and rack elements are properly synchronized.

As in the last cited patent the return of film holder C of the present invention is effected by the line delivery lever 21 (Figure 1c) moving clockwise to its starting position shown in Figure 1c. Thus, the return of the film holder by lever 21 is accomplished not by the train of connections which controls the step-by-step gravitational descent of the film holder but by a chain 312 one end of which is connected to the delivery lever 21 and the other end to the film holder C.

However, as set forth herein above, when the machine is set for "centering" solenoid 90 is de-energized immediately after the last matrix is photographed, thus, releasing roller clutch 34. Accordingly, with the return mechanism of the above cited patent, the vertical rack U, shaft I, gears Q and 28 and gear 70 would be disconnected from horizontal rack R thus incapacitating the machine. This condition also would prevail for "flush left" but not for "justification" and "flush right" because during "justification" and "flush right" operations the 1:1 clutch 34 is constantly engaged and the 1:2 clutch remains constantly dis-engaged.

To overcome this condition, the vertical rack U and film holder C are resiliently connected as shown in Figures 1a and 1b. Referring to Figure 1a, wherein the film holder C is disposed in its uppermost non-operating position, the indention control mechanism is the same as in the last cited patent up to the adjustable head V which is axially bored to freely pass an extension rod 314 of adjusting rod 316. The horizontally disposed portion of bracket W, attached to film holder C, has threadedly mounted therein an adjustable hollow bushing 320 through the bore of which is slidably fitted the extension rod 314. This bushing is provided with a lock nut whereby it may be secured after adjustment. Threadedly attached to the upper end of bushing 320 is a pair of jam nuts 322 and 324. The upper portion of nut 324 is bored to clear the upper end of extension rod 314. At the upper end of extension rod 314 is pivotally mounted a slotted cylindrical bar 326 which, when disposed vertically, forms a continuation of rod 314 and in such position permits ready removal of film holder C.

When bar 326 is disposed horizontally as shown in Figures 1, 1a and 1b, it serves to connect vertical rack U to film holder C so that when the machine is set for "centering" or "flush left" at which settings the 1:1 clutch 34 is disconnected during the time that the film holder C is being raised to starting position, the top surface of jam nut 324 will engage bar 326 and thereby cause the vertical rack U and its associated gearing to be restored to starting position at which, as set forth above, locking rod 226 will lock the various gear trains in synchronized relation.

Referring to Figure 1b, it may readily be seen that the "initial drop," to compensate for various degrees of enlargement in order to maintain a uniform left-hand margin, occurs in a manner similar to that disclosed in Patent No. 2,552,882 in that the lower surface of bushing 320 gravitates into contact with the upper surface of adjustable head V. Bushing 320 will remain in contact with adjustable head V during the entire descent of the film holder C during photographing and, when the holder is drawn back to the position shown in Figure 1, jam nut 324 will engage bar 326 thus raising rack U and its associated mechanism to starting position. It should be noted that in order to set the bar 326 in vertical position for removal of the film holder it is necessary that the film holder C be dropped to line starting position.

SUMMARY OF OPERATION

The operation of the mechanism may be summarized as follows:

The matrices are selected from the magazine by actuation of appropriate keys on the keyboard and assembled into a column. At or prior to this time the selector knob 160 is pre-set in the appropriate position in accordance with the type of operation desired. The operator then "sends in" the line by pressing a lever to raise the assembled column of matrices into position ahead of the line follower F, which is latched in a retracted position some distance to the right of the position at which it appears in Figure 1. As the column of matrices M reaches the appropriate position, the latch is tripped, releasing the spring-loaded line follower F and allowing it to push the column of matrices leftward to the position at which the finger G of the line follower strikes the stop S and is engaged beneath the latch L, as shown in Figure 1. As the latch L is cammed upwardly by the finger G, it presses the rail H upwardly, actuating the switch J. This initiates rotation of the main cam shaft through an angle of approximately 150°. The operation of the machine during this 150° rotation depends upon the setting of the selector knob 160.

"Centering"

When the selector knob 160 is set for "centering" operation, the cam 156 is positioned as shown in Figure 16B and the locking slide 140 is held at its farthest left position by the spring 146, as viewed in Figures 16B and 10. At this position, both the rods 82 and 102 are unlocked and held in their lower positions by the springs 86 and 104 respectively. In this condition the roller clutch 34 (Figures 2 and 4) is disengaged and the key clutch 62 (Figure 7) is engaged so that the rack R is connected to the film holder C through the secondary gear train, but not the primary gear train. Thus, during the first 150° rotation of the main cam shaft, during which the rack moves through the line shortage distance to press the column of matrices against the endwall E of the camera unit, the film holder advances proportionately one-half as far so that one-half of the line shortage appears at the left hand end of the line.

The line shortage movement is initated by the tripping of switch J which effects release of the main cam shaft for the first 150° rotation. At the beginning of this rotation the elevator D starts to descend after which the locking rod 226 and the actuating rod 244 (Figures 11 and 12) are pulled down by a lever 248 cooperating with a cam on the main cam shaft. This unlocks the gears 22 and 28, freeing rack R and the film holder C (Figure 1) for movement, the rack R moving to the extent of the line shortage and the film holder C moving to the extent of one-half the line shortage.

As the column of matrices M reaches the endwall E of the camera unit, it closes the switch 264 (Figures 17 and 18) energizes the lower solenoid 90 through the circuit including the switch 258 which is closed by the cam 260 when the selector knob 160 is set in "centering" position. Energization of the solenoid 90 raises the rod 82, engaging the roller clutch 34. Shortly thereafter, the distributing elevator D seats in matrix receiving position, closing and holding closed the switch 262 (Figures 1 and 18), energizing the solenoid 128 through a circuit including switch 258 which is closed by the cam 260 in the "centering" position. Energization of the solenoid 128 raises the rods 102 and 96, disengaging the key clutch 62 (Figure 7) and rendering the secondary gear train inoperative. Thus, prior to the photographing of any matrices, the rack R is connected to the film holder C through the primary gear train so that a fresh film field is presented for each succeeding character image. The last character image will, accordingly, fall to the left of the right-hand margin a distance equal to one-half of the line shortage, and the line will be centered.

As the distributor bar D seats in matrix receiving position on top of the light cabinet B, causing bell-crank K to rotate in a clockwise direction, pushing the rod N and closing switch 262, the pushing of rod N to close switch 262 also causes engagement of the drive clutch in the camera unit A. This causes movement of the matrix transporting chains in the camera unit to engage the matrices in the column M and remove them individually and successively along the endwall E to a photographing position and thence to an upper position at which they are discharged onto the distributing elevator D.

As the matrices are individually and successively removed from the column, the line follower F, urged leftward by the spring 20 (Figure 1c) and by the weight of film holder C, pushes the remaining matrices leftward to fill up the space vacated and to bring the next succeeding matrix into engagement with endwall E of the camera unit. The incremental distances traveled by the line follower F are thus equal to the thickness of the matrices removed, these thicknesses in turn being proportionate to the setwise width of the photographic characters respectively borne by the matrices. Since the primary or 1:1 ratio gear train is in use during this photographing operation, the film is advanced stepwise by distances sufficient to present a fresh film field for each succeeding character image.

After the last matrix has been photographed the overtravel of the matrix aligning bar 298 (Figure 17) opens the switch 264, de-energizing the solenoid 90 and allowing the spring 86 (Figures 2 and 9) to pull down the rod 82, disengaging the roller clutch 34 and rendering the primary gear train inoperative. During the part of the 210° rotation of the main cam shaft when the distributing elevator D (Figure 1) is raised, the switch 262 is opened, de-energizing the solenoid 128 and allowing the spring 104 (Figures 2 and 9) to pull down the rods 102 and 96, engaging the key clutch 62 (Figure 7) and reconnecting the secondary gear train to ready the mechanism for the next line.

When the last matrix has been removed for photographing, the line follower F engages the endwall E of the camera unit, rocking latch L upwardly and closing the switch Z (Figure 1), starting the main cam shaft in rotation through the remaining 210°. During this latter rotation of the main cam shaft, the distributing elevator D is raised to transfer the matrices to a distributing mechanism by which they are returned to their respective channels in the magazine.

Immediately the 210° rotation starts, the line follower F is driven back to line receiving position and en route engages the rack R which is thus returned to starting position in the manner disclosed in U. S. Patent No. 2,552,882.

During the 150° rotation of the main cam shaft, at which time the line shortage is measured, rack R and meshing gear 22 moved independently of the compound miter-and-spur gear 28 thus causing misalignment of the pitches thereof. This misalignment remains constant during photographing, after which solenoids 90 and 128 are released, clutches 34 and 62 are disengaged and film holder C and rack R are returned to rest position at which the pitch of gears 22 and 28 are again in alignment. Shortly after gears 22 and 28 come to rest locking rod 226 is raised into engagement with teeth thereof and thus lock them against rotation.

The functioning of the machine in the other types of operation is similar except as hereinafter described.

In all types of operation other than justification, the justification rail locking rod 194 is pressed to the right, as viewed in Figure 14, by the cam 204 (as shown in Figure 16A) bringing its end into engagement in the peripheral groove 206a in the justification post 206. This prevents raising of the justification rail during the first 150° rotation of the main cam shaft, and leaves the matrices M spaced from the endwall of the camera unit a distance corresponding to the line shortage.

"Justification"

Movement of the selector knob 160 to the "justification" position causes the cam 204 (Figure 14) to be rotated to the position at which the notch 204a is aligned with the end of the locking bar 194 (as shown in Figure 16C), allowing the spring 200 to push the locking bar to the left, as viewed in Figure 14, removing the opposite end of the locking bar from engagement with the peripheral groove 206a in the justification post 206 which is thereby freed for vertical movement.

During the first part of the initial 150° rotation of the main cam shaft the elevator D starts to descend and the justification posts 205 and 206 (Figures 8 and 14) are raised by a lever cooperating with a cam on the main cam shaft (not shown) driving up the right-hand end of the justification rail AA, with the left-hand end of this rail pivoting about an axis coincident with the axis of the justification-rail-riding roller of wedge BB of line follower F when said follower reaches its leftmost position against endwall E (except in the case of tabular justification, where it may pivot about an axis located to the right of the endwall E). This drives up the wedge BB and forces the plunger CC leftward to push the column of matrices M against the endwall E of the camera unit, a distance of movement corresponding to the line shortage. The angle assumed by the justification rail AA is thus proportional to the line shortage. The justification posts are then locked against vertical movement.

Movement of the selector knob 160 from "centering" position to the "justification" position causes the projection 187 on the cam 176 (Figures 8 and 16A to 16D) to close the switch 170 (Figures 15 and 18), momentarily energizing the solenoid 90 (Figures 18, 2 and 8), driving up the rod 82 (Figure 2), engaging the roller clutch 34 (Figures 2 and 4) connecting the line follower F and rack R to the film holder C (Figure 1) through the primary or 1:1 gear train.

Movement of the selector knob 160 to the "justification" position also causes one of the projections 192 on the cam 190 (Figures 8, 16B and 16C) to close the switch 188 (Figures 18 and 2), momentarily energizing the solenoid 128. This causes the plunger 126 (Figure 2) of the solenoid 128 to move to the right, as viewed in Figure 2, drawing the link 122 to the right, rotating the lever 114 in a counterclockwise direction and the bell-crank 108 in a clockwise direction and pushing up the rods 102 and 96 to disengage the key clutch 62 (Figure 7). This renders the secondary or 1:2 drive train inoperative.

The rods 82, 102 and 96 are locked in their upper positions by the locking slide 140 (Figure 10) which, when selector knob 160 is moved to "justification" as shown in Figure 16C, is pressed inwardly by the cam 156 a distance sufficient to bring the locking slide into engagement with the notches in both of the two rods 82 and 102. This maintains the roller clutch 34 (Figures 2 and 4) engaged and the key clutch 62 (Figure 7) disengaged. The line follower F and rack R are thus connected to the film holder C only through the primary or 1:1 gear train.

The locking rod 208 (Figures 7 and 2) is held downwardly against the force of the spring 134 (Figure 2) by the cam 222, as shown in Figure 16C, holding the rod 208 out of engagement with the gear 70 and allowing rotation of this gear as well as the compound gear 28 and the remainder of the gear train linked to the film holder C (Figure 1). However, in "justification" operation, there is no movement of the rack or of the film holder prior to photographing because they are locked in position by the locking rod 226 (Figure 3).

Immediately following the justification post locking action, the locking rod 226 and the actuating rod 244 (Figures 11 and 12) are pulled down by lever 248 cooperating with a cam on the main cam shaft. This unlocks the gears 22 and 28, freeing rack R and film holder C (Figure 1) for movement.

The starting of the camera, the photographing of the composed line and the return of the various machine elements to "rest" position is the same as just described under "Centering" with the principle exception that, because locking slide 140 constantly retains roller clutch 34 in its active condition and key clutch 62 in its inactive condition, energization of solenoids 90 and 128 through switches 264 and 262, respectively, will cause idle strokes of the plungers of the solenoids.

*"Flush right"*

When the selector knob 160 is moved from the "centering" position to the "justification" position en route to the "flush right" position, the cam 176, as may be seen by comparing the third views from the top in Figures 16C and 16D, actuates the switch 170 (Figures 8, 15 and 18), momentarily energizing the solenoid 90 and causing it to drive the rod 82 (Figure 2) upwardly, engaging the roller clutch 34. This connects the line follower F and rack R to the film holder C through the primary gear train. This movement of the selector knob 160, as shown in the fourth views from the top in Figures 16C and 16D, also causes one of the projections 192 on the cam 190 to actuate the switch 188 (Figure 18), momentarily energizing the solenoid 128. This raises the rods 102 and 96 (Figure 2) disengaging the key clutch 62 (Figure 7) and rendering the secondary gear train inoperative. The rods 82, 102 and 96 are locked in their upper positions by the locking plate 140 (Figure 10), which when pressed to its farthest right position by the cam 156, as illustrated in Figure 16D will continue to hold the rods locked in their upper positions. Thus, the line follower F and rack R are connected to the film holder through the primary or 1:1 gear train.

Near the beginning of the initial 150° rotation of the main cam shaft, the lever 248 (Figures 11 and 12) is pulled down, pulling down the locking rod 226 and unlocking the gears 22 and 28 (Figure 3). This allows the line follower F and rack R (Figure 1) to move through the line shortage distance and press the column of matrices M against the end wall E of the camera unit. Since the film holder C is coupled to the rack R through the primary gear train, it also moves through the line shortage distance prior to photographing of the first matrix so that the first character image of the line falls on the film at a distance from the left-hand margin equal to the line shortage, and the line is presented flush with the right margin.

The starting of the camera, the photographing of the composed line and the return of the various machine elements to "rest" position is the same as in "justification" operation.

*"Flush left"*

When the selector knob 160 is moved from "centering position" to the "flush left" position, as may be seen by comparing the fourth figures from the top in Figures 16A and 16B, one of the projections 192 on the cam 190 actuates the switch 188 (Figure 18) momentarily energizing the solenoid 128. This pulls its plunger 126 (Figure 2) to the right, and through the interconnecting linkage, raises the rods 102 and 96, disengaging the key clutch 62 (Figure 7). The rod is locked in its upper position by the locking plate 140 (Figure 10) which, as may be seen in the second view from the top in Figure 16A, is in a position slightly to the right of the position which it occupies for "centering" operation, in which it is shown in Figure 10, so that the locking slide 140 is in engagement with the rod 102, but not the rod 82. The rod 82 is therefore held down by the spring 86 (Figure 2), and the roller clutch 34 is disengaged.

Thus, both of the clutches 34 and 62 are disengaged and the rack R is not connected to the film holder C through either the primary or secondary gear trains. Moreover, the film holder C is locked in its starting position by the locking rod 208 (Figure 2) which is in engagement with the spur gear 70 by virtue of the fact that the cam 222 is so oriented that its notch 222a is presented to the collar 224 on the rod 208 (as shown in the uppermost view of Figure 16A), allowing the spring 134 (Figure 2) to drive the rod upwardly and bring its upper end into engagement with the gear 70. The film holder C is thus prevented from moving during the movement of the rack R and line follower F to press the column of matrices M against the endwall E of the camera unit.

As soon as the column of matrices M reaches the endwall E of the camera unit, it causes closure of the switch 264 (Figures 17 and 18), energizing the solenoid 90 through a circuit including the switch 258 which is closed by the cam 260 in the "flush left" and "centering" positions of the selector knob 160. The switch 264 is held closed during photographing by the toggle mechanism 296 (Figure 17) which is tripped to hold position by passage of the first matrix to photographing position. Energization of the solenoid 90 raises the rod 82 (Figure 2) engaging the roller clutch 34 and connecting the rack R to the film holder C through the primary or 1:1 gear train. Shortly thereafter, the distributing elevator D seats in matrix receiving position, closing and holding closed with switch 262 (Figures 1 and 18), energizing the solenoid 128 through a circuit including switch 258 which is closed by the cam 260 in the "flush left" position. Since the rods 102 and 96 were raised and locked in their raised position when the selector knob 160 was set for "flush left" operation, energization, at this time, of solenoid 128 is utilized to cause locking rod 208 to be withdrawn from engagement with spur gear 70 thereby freeing film holder C and rack R for movement as each matrix is removed from the line, for photographing. Thus, as each matrix is removed for photographing, the film is advanced sufficiently to provide a fresh film field for the image of the character borne thereby.

After the last matrix has passed the photographing position, the over-travel of the matrix-aligning bar 298 (Figure 17) throws the toggle 296 in the opposite direction, opening the switch 264 (see also Figure 18), de-energizing the solenoid 90 and allowing the spring 86 (Figure 2) to pull the rod 82 downwardly, disengaging the roller clutch 34 and readying the machine for the next line.

The starting of the camera, the photographing of the composed line and the return of the various machine elements to "rest" position is the same as described under "Centering."

From the foregoing description, it will be appreciated that there is provided a mechanism for achieving either "centering," "justification," "flush right," or "flush left" operation as desired. It will further be appreciated that the mechanism is practical in construction and operation and is adapted so that it may be incorporated in existing photocomposing machines with a minimum of reconstruction. It will therefore be appreciated that the aforementioned and other desirable objectives have been achieved. However, it should be emphasized that the particular embodiment of the invention which is shown and described herein is intended as merely illustrative and not as restrictive of the invention.

We claim:

1. In a quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage said column of elements and urge it toward said endwall, a first train of drive elements intermonnecting said follower member and said film holder whereby movement of said follower member as said column is shortened by removal of said character bearing elements for photographing permits movement of said film holder at such ratio as to present a fresh film field for each successive character image, a second train of drive elements adapted to interconnect said follower member and said film holder to permit movement of said film holder at a ratio approximately one-half the ratio of said first train, and means to disconnect said first train of drive elements and to connect said second train of drive elements and vice versa, as desired.

2. In quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage said column of elements and urge it toward said endwall, a stop assembly adapted to engage said line follower and stop the same at a distance from said endwall proportional to a preset line length, a releasable latch for unlocking said stop assembly and for unlocking the same to allow said line follower member to press said column of elements against said endwall, a first train of drive elements interconnecting said follower member and said film holder whereby movement of said follower member as said column is shortened by removal of said character bearing elements for photographing permits movement of said film holder at such ratio as to present a fresh film field for each successive character image, a second train of drive elements adapted to interconnect said follower member and said film holder to permit movement of said film holder at a ratio approximately one-half the ratio of said first train, control means for disconnecting said first train of drive elements and for connecting said second train of drive elements, if centering is desired, to cause said film holder and said film to move a distance corresponding to one-half the difference between said preset line length and the length of the column of elements during movement of said line follower member from such locked position into position to press said column of elements against said endwall, and control means operable after movement of said column of elements toward said endwall and before removal of said elements for photographing for disconnecting said second train of drive elements and reconnecting said first train of drive elements.

3. In quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage the trailing end of said column of elements, a rack, a primary train of drive gears and a first clutch mechanically linking said rack and said film holder, a stop member adjustably positioned along said rack and arranged to engage and stop said line follower member at a distance from said endwall corresponding to a preset line length, a latch releasably engaging said rack to permit movement of said rack, said stop member and said line follower member from said stopped position to the position where said line follower member presses said column of elements against said endwall, a secondary train of drive gears interconnecting gears at opposite sides of said first clutch at a ratio of one-half the ratio at which they are interconnected in said primary gear train, said secondary gear train including a second clutch, electrically operated means for actuating said first and second clutches, manually operable switch means for actuating said electrically controlled means to engage said second clutch and disengage said first clutch during movement of said line follower, said stop member and said rack from latched position to said position where said line follower member presses said column of elements against said endwall, if centering is desired, and switch means mechanically operable after movement of said column of elements toward said endwall and before removal of said elements for photographing to actuate said electrically controlled means to engage said first clutch and disengage said second clutch.

4. In quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage said column of elements and urge it toward said endwall, a first train of drive elements interconnecting said follower member and said film holder whereby movement of said follower member as said column is shortened by removal of said character bearing elements for photographing permits movement of said film holder at such ratio as to present a fresh film field for each successive character image, a second train of drive elements adapted to interconnect said follower member and said film holder to permit movement of said film holder at a ratio approximately one-half the ratio of said first train, and means to connect either one of said trains of drive elements and to disconnect both of said trains of drive elements as desired.

5. In quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage said column of elements and urge it toward said endwall, a stop assembly adapted to engage said line follower and stop the same at a distance from said endwall proportional to a preset line length, a releasable latch for unlocking said stop and allowing said line follower member to press said column of elements against said endwall, a first train of drive elements interconnecting said follower member and said film holder whereby movement of said follower member as said column is shortened by removal of said character bearing elements for photographing permits movement of said film holder at such ratio as to present a fresh film field for each successive character image, a second train of drive elements adapted to interconnect said follower member and said film holder to permit movement of said film holder at a ratio approximately one-half the ratio of said first train, control means for connecting either desired one of said trains of drive elements and for disconnecting both of said trains of drive elements during movement of said line follower from such latched position into position to press said column of elements against said endwall, depending upon whether centering, justification, flush left or flush right operation is desired, and control means operable after movement of said column of elements toward said endwall and before removal of said elements for photographing for connecting said first train of drive elements.

6. In quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage the trailing end of said column of elements, a rack, a primary train of drive gears and a first clutch mechanically linking said rack and said film holder, a stop member adjustably positioned along said rack and arranged to engage and stop said line follower member at a distance from said endwall corresponding to a preset line length, a latch engaging said rack to lock the same and being releasable to permit movement thereof, said stop member and said line follower member from such stopped position to the position where said line follower member presses said column of elements against said endwall, a secondary train of drive gears interconnecting gears at opposite sides of said first clutch at a ratio of one-half the ratio at which they are interconnected in said primary gear train, said secondary gear train including a second clutch, electrically controlled means for engaging said clutches, selector switch means for controlling said electrically controlled means to cause only said first clutch to be engaged for flush right operation, only said second clutch to be engaged for centering operation and neither of said clutches to be engaged for flush left operation during movement of said line follower member from such stopped position to the position where said line follower member presses said column of elements against said endwall, and switch means operable after movement of said column of elements toward said endwall and before removal of said elements for photographing to actuate said electrically controlled means to engage said first clutch and disengage said second clutch.

7. In quadding and centering mechanism for a photocomposing machine of the type wherein photographable character bearing elements having thicknesses proportioned to the setwise widths of the characters respectively borne thereby are assembled into a column against an endwall in said machine and individually and successively removed therefrom for photographing, and wherein a film holder carrying a photographic film is indexed in a setwise direction between such successive exposures to space the successive character images along the film in a composed line, a line follower member adapted to engage the trailing end of said column of elements, a rack, a primary train of drive gears and a first clutch mechanically linking said rack and said film holder, a stop member adjustably positioned along said rack and arranged to engage and stop said line follower member at a distance from said endwall corresponding to a preset line length, a plunger mounted on said line follower for relative movement in the direction of said endwall, a justification rail mounted for pivotal movement about a transverse axis, drive means to cause said justification rail to operatively move said plunger and thereby push said column of matrices against said endwall and come to rest at an angle proportional to the line shortage, a master control element movable to various positions in accordance with the type of operation desired, a lock member controlled by said master control element and cooperating with said justification rail to lock the same against such movement in all positions of said master control element except the justification position, a latch releasably engaging said rack, actuating means operable after operation of the drive means for said justification rail for releasing said latch to permit movement of said rack said stop member and said line follower member from such stopped position to press said column of elements against said endwall, a secondary train of drive gears interconnecting gears at opposite sides of said first clutch at a ratio of one-half the ratio at which they are interconnected in said primary gear train, said secondary gear train including a second clutch, electrically controlled means for engaging said clutches, switch means operable by said master control element for controlling said electrically operated means to cause only said first clutch to be engaged when said master control element is set for flush right operation, only said second clutch to be engaged for centering operation and neither of said clutches to be engaged for flush left operation during movement of said line follower member from such stopped position to the position where said line follower member presses said column of elements against said endwall, and switch means operable in flush left and centering operation after movement of said column of elements toward said endwall and before removal of said elements for photographing to actuate said electrically controlled means to engage said first clutch only.

No references cited.